United States Patent
Li et al.

(10) Patent No.: US 11,862,048 B2
(45) Date of Patent: Jan. 2, 2024

(54) FLEXIBLE DISPLAY APPARATUS AND ELECTRONIC DEVICE

(71) Applicant: Wuhan Tianma Micro-Electronics Co., Ltd., Wuhan (CN)

(72) Inventors: Shengming Li, Wuhan (CN); Gaojun Huang, Shanghai (CN)

(73) Assignee: WUHAN TIANMA MICRO-ELECTRONICS CO., LTD., Wuhan (CN)

( * ) Notice: Subject to any disclaimer, the term of this patent is extended or adjusted under 35 U.S.C. 154(b) by 105 days.

(21) Appl. No.: 17/646,476

(22) Filed: Dec. 29, 2021

(65) Prior Publication Data

US 2023/0089831 A1    Mar. 23, 2023

(30) Foreign Application Priority Data

Sep. 23, 2021    (CN) .......................... 202111117451.X

(51) Int. Cl.
     *G09F 9/30*      (2006.01)

(52) U.S. Cl.
     CPC ..................... *G09F 9/301* (2013.01)

(58) Field of Classification Search
     CPC ...................................................... G09F 9/301
     See application file for complete search history.

(56) References Cited

U.S. PATENT DOCUMENTS

| | | | | |
|---|---|---|---|---|
| 8,711,566 B2* | 4/2014 | O'Brien | ................ | G06F 1/1652 |
| | | | | 361/724 |
| 10,162,387 B2* | 12/2018 | Takayanagi | ......... | H04M 1/0268 |
| 11,170,671 B1* | 11/2021 | Han | ....................... | G06F 1/1601 |
| 11,216,106 B2* | 1/2022 | Lindblad | ................ | G09F 9/301 |
| 2012/0204453 A1 | 8/2012 | Jung | | |
| 2015/0047796 A1* | 2/2015 | Peng | ....................... | G09F 11/34 |
| | | | | 160/323.1 |
| 2017/0278436 A1* | 9/2017 | Chu | ..................... | H10K 77/111 |
| 2017/0329369 A1* | 11/2017 | Takayanagi | ............ | G09F 9/301 |
| 2018/0095551 A1* | 4/2018 | Lindblad | ................ | H10K 50/80 |
| 2020/0068728 A1* | 2/2020 | Kang | ..................... | G09F 9/301 |

(Continued)

FOREIGN PATENT DOCUMENTS

| | | |
|---|---|---|
| CN | 111583797 A | 8/2020 |
| CN | 111862822 A | 10/2020 |
| CN | 113112920 A | 7/2021 |

*Primary Examiner* — Lisa Lea-Edmonds
(74) *Attorney, Agent, or Firm* — Anova Law Group, PLLC

(57) ABSTRACT

A flexible display apparatus and an electronic device are provided in the present disclosure. The flexible display apparatus includes a flexible display panel, a supporting structure, and a locking part. Both the flexible display panel and the supporting structure are capable of being rolled in the hollow space, the supporting structure includes a plurality of supporting plates, and at least a first degree of rotation freedom is between two adjacent supporting plates. The supporting structure has an unfolded state; in the unfolded state, both the supporting structure and the flexible display panel at least partially extend out of the main body structure; and the locking part acts on the supporting structure that extends from the main body structure to limit the first degree of rotation freedom of the plurality of supporting plates, such that the supporting structure flatly supports the flexible display panel.

29 Claims, 10 Drawing Sheets

(56) References Cited

U.S. PATENT DOCUMENTS

| | | | | |
|---|---|---|---|---|
| 2020/0192495 A1* | 6/2020 | Lindblad | ............... | G06F 3/0412 |
| 2022/0121313 A1* | 4/2022 | Lindblad | ............... | G06F 1/1652 |
| 2022/0317732 A1* | 10/2022 | Lee | ...................... | H04M 1/021 |
| 2022/0369477 A1* | 11/2022 | Jo | ........................ | G06F 1/1681 |
| 2023/0004189 A1* | 1/2023 | Luo | ...................... | G06F 1/1656 |
| 2023/0089831 A1* | 3/2023 | Li | .......................... | G09F 9/301 |
| | | | | 361/679.01 |

\* cited by examiner

US 11,862,048 B2

FLEXIBLE DISPLAY APPARATUS AND ELECTRONIC DEVICE

CROSS-REFERENCE TO RELATED APPLICATION

This application claims the priority of Chinese Patent Application No. 202111117451.X, filed on Sep. 23, 2021, the content of which is incorporated herein by reference in its entirety.

TECHNICAL FIELD

The present disclosure generally relates to the field of display technology and, more particularly, relates to a flexible display apparatus and an electronic device.

BACKGROUND

As the market demand for flexible displays increases, more attention has been paid to the research and development of various flexible display apparatuses. As an important current development trend of flexible display panels, the sliding roll technology can freely switch the display area of the flexible display panel according to the user's own needs, which greatly improves the user experience. However, in the current scrolling mechanism, the flexible display panel does not have desirable support when the scrolling region is in a flat state, which causes the flexible display panel to bend when being unfolded, which affects the normal display of the flexible display panel.

Therefore, there is a need to develop a new flexible display apparatus and a new electronic device.

SUMMARY

One aspect of the present disclosure provides a flexible display apparatus. The flexible display apparatus includes a flexible display panel, a supporting structure, and a locking part. Both the flexible display panel and the supporting structure are capable of being rolled in the hollow space, the supporting structure includes a plurality of supporting plates, and at least a first degree of rotation freedom is between two adjacent supporting plates. The supporting structure has an unfolded state; in the unfolded state, both the supporting structure and the flexible display panel at least partially extend out of the main body structure; and the locking part acts on the supporting structure that extends from the main body structure to limit the first degree of rotation freedom of the plurality of supporting plates, such that the supporting structure flatly supports the flexible display panel.

Another aspect of the present disclosure provides an electronic device including a flexible display apparatus. The flexible display apparatus includes a flexible display panel, a supporting structure, and a locking part. Both the flexible display panel and the supporting structure are capable of being rolled in the hollow space, the supporting structure includes a plurality of supporting plates, and at least a first degree of rotation freedom is between two adjacent supporting plates. The supporting structure has an unfolded state; in the unfolded state, both the supporting structure and the flexible display panel at least partially extend out of the main body structure; and the locking part acts on the supporting structure that extends from the main body structure to limit the first degree of rotation freedom of the plurality of supporting plates, such that the supporting structure flatly supports the flexible display panel.

Other aspects of the present disclosure can be understood by those skilled in the art in light of the description, the claims, and the drawings of the present disclosure.

Compared with the existing technology, the flexible display apparatus provided by embodiments of the present disclosure includes the main body structure, the flexible display panel, and the supporting structure. The main body structure has the hollow space; and both the flexible display panel and the supporting structure are capable of being rolled in the hollow space. The supporting structure has the unfolded state; in the unfolded state, both the supporting structure and the flexible display panel at least partially extend out of the main body structure, thereby realizing unfolded display of the flexible display panel under the support of the supporting structure. In order to realize that the supporting structure can be rolled in the hollow space, the supporting structure includes the plurality of supporting plates, and at least the first degree of rotation freedom is included between two adjacent supporting plates. In order to avoid relative rotation of the plurality of supporting plates in the unfolded state, the flexible display apparatus further includes the locking part, which acts on the supporting structure that extends out of the main body structure to limit the first degree of rotation freedom of the supporting plates. Therefore, in the rolled state, the support plates can be relatively rotated and rolled in the hollow space, reducing the space occupied by the supporting structure; and in the unfolded state, when the flexible display panel and the supporting structure extend out of the main body structure, the locking part can limit the relative rotation between adjacent supporting plates. Therefore, it may ensure that the supporting plates can flatly support the flexible display panel, such that the flexible display panel may maintain the flat state when being unfolded, and the display effect of the flexible display apparatus may be improved.

BRIEF DESCRIPTION OF THE DRAWINGS

In order to more clearly explain various embodiments of the present disclosure, the drawings required for describing the embodiments or the existing technology are briefly introduced hereinafter. Obviously, the drawings in the following description are merely some embodiments of the present disclosure. Other drawings may also be obtained by those skilled in the art without any creative work according to provided drawings.

DETAILED DESCRIPTION

The features and exemplary embodiments of various aspects of the present disclosure are described in detail hereinafter. In the following detailed description, specific details are provided in order to facilitate a comprehensive understanding of the present disclosure. However, it is obvious to those skilled in the art that the present disclosure can be implemented without some of these specific details. The following embodiment description is only to provide a better understanding of the present disclosure by showing examples of the present disclosure.

It should also be noted that in the present disclosure, relational terms such as first, second and the like may be merely used to distinguish one entity or operation from another entity or operation and may not necessarily require or imply any such actual relationship or order between these entities or operations. Moreover, the terms "include", "contain" or any other variations thereof may be intended to cover non-exclusive inclusion, so that a process, method, article or equipment that includes a series of elements includes not only those elements, but also other elements that are not explicitly listed, or also includes elements inherent to the process, method, article, or equipment. If there are no more restrictions, the elements defined by the sentence "include . . . " does not exclude the existence of other same elements in the process, method, article or equipment that includes the elements.

Figure 1:
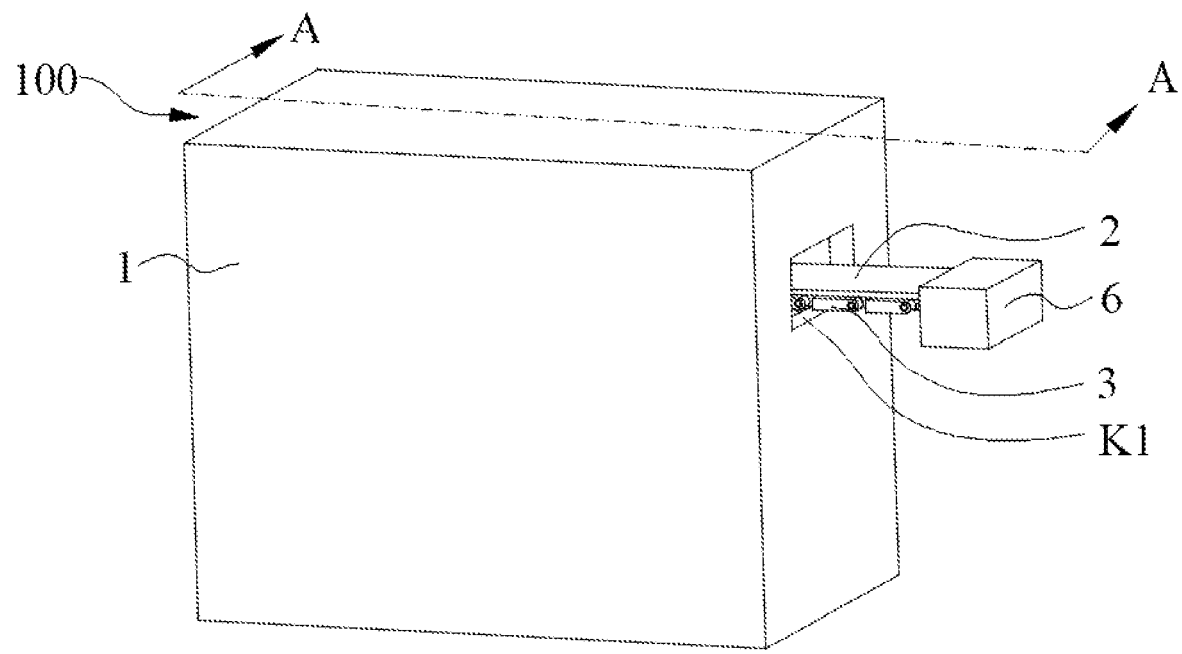
FIG. 1 illustrates a structural schematic of a flexible display apparatus according to various embodiments of the present disclosure.

Referring to FIG. 1, a bendable flexible display apparatus may include two display states, one state is a rolled state where a flexible display panel 2 is rolled in a hollow space S1, and the other state is the unfolded state where the flexible display panel 2 extends out of the hollow space S1. In the existing technology, the unfolding of the flexible display panel 2 is normally achieved through a telescopic structure including a plurality of connecting rods hinged with each other. One end of the telescopic structure is connected to the ending portion of the flexible display panel 2. The plurality of connecting rods can be far away from or adjacent to each other by rotating the plurality of connecting rods, such that the flexible display panel 2 can be unfolded or retracted. However, such arrangement structure has the following disadvantages. During the extending process of the telescopic structure, that is, when the plurality of connecting rods are far away from each other, it may not only cause an increase in the size of the telescopic structure along the extending direction, but also cause a decrease in the size of the telescopic structure along the direction perpendicular to the extending direction, which may reduce the stability of the telescopic structure. Meantime, the telescopic structure may not achieve stable support of the flexible display panel 2, which may reduce the reliability of the flexible display apparatus.

Therefore, the existing telescopic structure may only realize the rolling and unfolding of the flexible display panel 2 and may not realize stable support of the flexible display panel 2. In order to realize the support of the flexible display panel 2 in the unfolded state, the flexible display apparatus often needs to be disposed with a supporting part. Due to the limited space of the flexible display apparatus, it is necessary to roll the supporting part in the hollow space S1 in the rolled state, that is, it is necessary to ensure that the supporting part needs to have a certain degree of both flexibility and rigidity. On the one hand, the requirement for manufacturing materials, manufacturing technology and design may increase, resulting in an increase in production costs. On the other hand, because the supporting part has the rolling characteristics. In such case, when the flexible display panel 2 is unfolded, once the supporting part is subjected to an external force, the supporting part may also be bent. Therefore, it is difficult to provide desirable support for the flexible display panel 2, such that the flexible display panel 2 may be bent when being unfolded, thereby affecting the display effect of the flexible display panel 2.

In order to solve above-mentioned problems, embodiments of the present disclosure provide a flexible display apparatus and an electronic device. The flexible display apparatus and the electronic device are be described in detail below with reference to the accompanying drawings.

Figure 2:
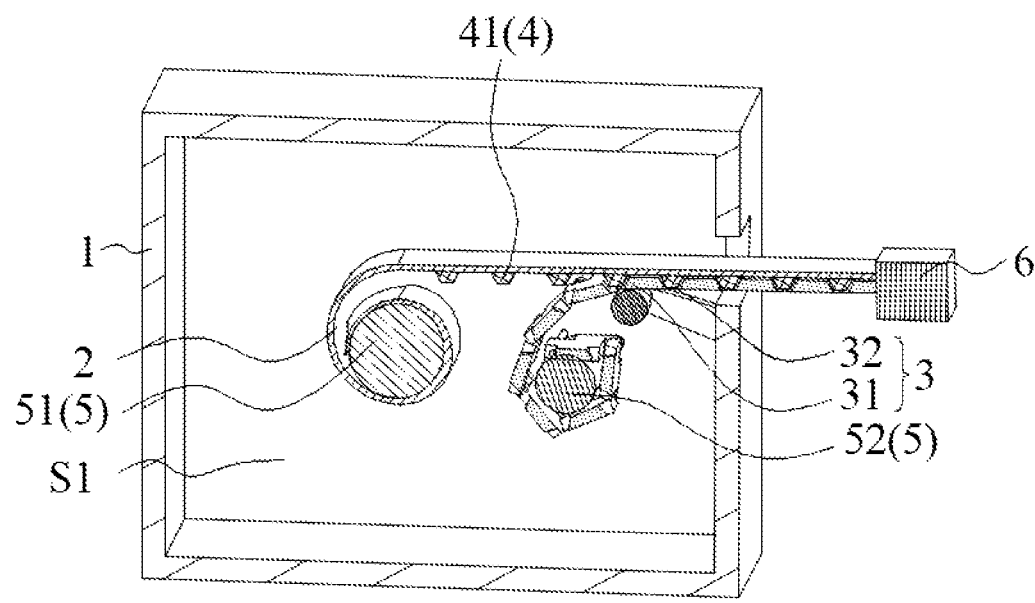
FIG. 2 illustrates a cross-sectional view of a flexible display apparatus along an A-A direction in FIG. 1.
Figure 3:
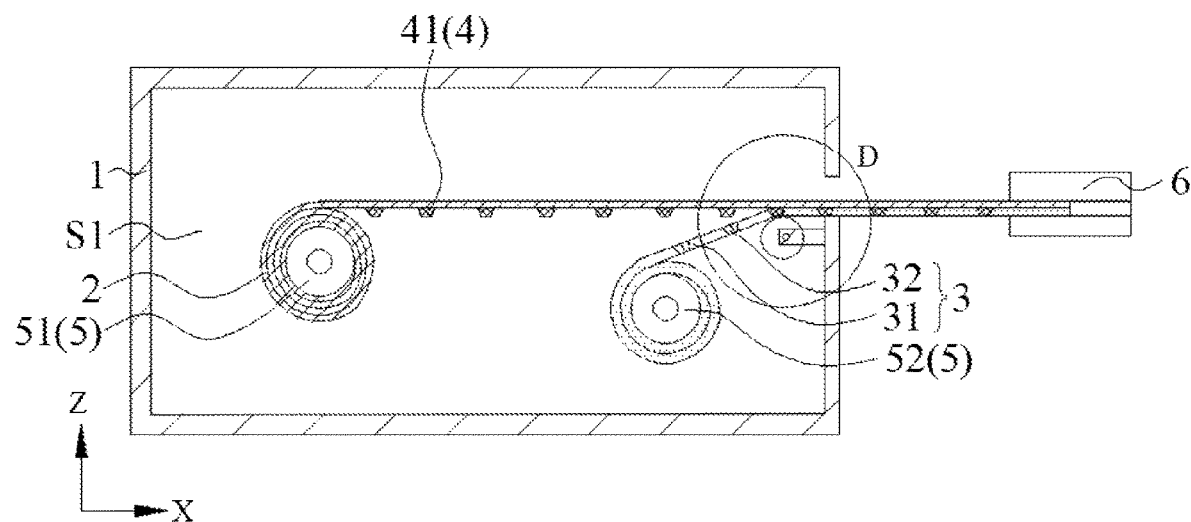
FIG. 3 illustrates another cross-sectional view of a flexible display apparatus along an A-A direction in FIG. 1.

Referring to FIGS. 1-3, FIG. 1 illustrates a structural schematic of a flexible display apparatus 100 according to various embodiments of the present disclosure; FIG. 2 illustrates a cross-sectional view of a flexible display apparatus 100 along an A-A direction in FIG. 1; and FIG. 3 illustrates another cross-sectional view of a flexible display apparatus 100 along an A-A direction in FIG. 1. Embodiments of the present disclosure provide the flexible display apparatus 100, which may include a main body structure 1 having the hollow space S1; the flexible display panel 2, a supporting structure 3, and a locking part 4. Both the flexible display panel 2 and the supporting structure 3 may be rolled in the hollow space S1, the supporting structure 3 may include a plurality of supporting plates 31, and at least the first degree of rotation freedom may be included between two adjacent supporting plates 31. The supporting structure 3 may have an unfolded state. In the unfolded state, both the supporting structure 3 and the flexible display panel 2 may at least partially extend out of the main body structure 1. The locking part 4 may act on the supporting structure 3 extending out of the main body structure 1 to limit the first degree of rotation freedom of the supporting plates 31, such that the supporting structure 3 may support the flexible display panel 2 flatly.

Embodiments of the present disclosure provide the flexible display apparatus 100, which may include the main body structure 1, the flexible display panel 2, and the supporting structure 3. The main structure 1 may have the hollow space S1. Both the flexible display panel 2 and the supporting structure 3 may be rolled in the hollow space S1. The supporting structure 3 may have the unfolded state. In the unfolded state, both the flexible display panel 2 and the supporting structure 3 may at least partially extend out of the main body structure 1, thereby realizing the unfolded display of the flexible display panel 2 under the support of the supporting structure 3. In order to realize that the supporting structure 3 can be rolled in the hollow space S1, the supporting structure 3 may include the plurality of supporting plates 31, and at least the first degree of rotation freedom may be included between two adjacent supporting plates 31. The first degree of rotation freedom may indicate that two adjacent supporting plates 31 can rotate around the joint between the two adjacent supporting plates. In order to avoid relative rotation of the plurality of supporting plates 31 in the unfolded state, the flexible display apparatus 100 may further include the locking part 4. The locking part 4 may act on the supporting structure 3 extending out of the main body structure 1 to limit the first degree of rotation freedom of the supporting plate 31. Therefore, in the rolled state, the supporting plates 31 can rotate relative to each other to be rolled in the hollow space S1, which may reduce the space occupied by the supporting structure 3; and in the unfolded state, when the flexible display panel 2 and the supporting structure 3 extend out of the main body structure 1, the locking part 4 may limit the relative rotation between the adjacent supporting plates 31. In such way, it may ensure that the supporting plates 31 can support the flexible display panel 2 flatly, so that the flexible display panel 2 may not bend when being unfolded and always maintain the flat state, thereby improving the display effect of the flexible display apparatus 100.

It should be noted that, for ease of understanding, the drawings provided in embodiments of the present disclosure may not be drawn according to actual scale. For example, the proportional relationship between the supporting structure 3, the flexible display panel 2 and the rolling axle may not be an actual proportional relationship and may be merely exemplary.

Considering that the telescopic structure in the existing technology can only realize the rolling and unfolding of the flexible display panel 2 and may not realize the stable support of the flexible display panel 2, the flexible display apparatus 100 provided in embodiments of the present disclosure may be disposed with the supporting structure 3 to realize the stable support of the flexible display panel 2 in the unfolded state. Furthermore, in order to solve different requirements on the supporting structure 3 of the flexible display panel 2 in the rolled state and the unfolded state, it may adopt a technical means capable of dynamically adjusting the degree of rotation freedom of the supporting structure 3. That is, on the one hand, the requirement that the supporting structure 3 can be rolled in the hollow space S1 in the rolled state may be realized by configuring the supporting structure 3 as the plurality of relatively rotatable supporting plates 31; on the other hand, the locking part 4 may be disposed, such that the locking part 4 may be gradually coupled with a locking groove 32 as the supporting structure 3 unfolds. Therefore, the relative rotation of adjacent supporting plates 31 in the unfolded state may be limited, thereby realizing the requirement that the supporting structure 3 can stably support the flexible display panel 2 in the unfolded state.

Therefore, compared with the telescopic structure in the existing technology, the flexible display apparatus provided in embodiments of the present disclosure may not only realize the telescopic function, but also realize the stable support of the flexible display panel 2 in the unfolded state. In addition, the supporting structure 3 may be configured as the plurality of relatively rotatable supporting plates 31, and the locking part 4 that can dynamically lock the relative rotation of the supporting plates 31 may be disposed, which may satisfy different requirements of the flexible display panel 2 for the supporting structure 3 in the rolled state and the unfolded state, and also simplify the structure of the flexible display apparatus and reduce the production cost.

The main body structure 1 may be the housing of the flexible display apparatus 100 to accommodate display devices such as the flexible display panel 2 and the like. The flexible display panel 2 may be an organic light-emitting diode (OLED) display panel, a liquid crystal panel, a micro flat display panel (micro-OLED or micro-LED), or the like. In the rolled state, the flexible display panel 2 may be located in the hollow space S1 of the main body structure 1; one part of the flexible display panel 2 may be in the rolled state, and the other part may be in the flat state for display, thereby realizing the display in the rolled state of the flexible display apparatus 100. In the unfolded state, the end of the flat side of the flexible display panel 2 may extend from the main body structure 1 and drive the rolled flexible display panel 2 to gradually unfold into a flat surface. Therefore, the display area of the flexible display apparatus 100 may be increased, and the display of the flexible display apparatus 100 in the unfolded state may be realized.

It can be understood that, in order to make the flexible display panel 2 in the rolled state unfold into a flat surface, the supporting structure 3 may need to realize that the supporting plates 31 may rotate relative to each other in the rolled state, and the supporting plates 31 may not rotate relative to each other under the limitation of the locking part 4 in the unfolded state.

Figure 4:
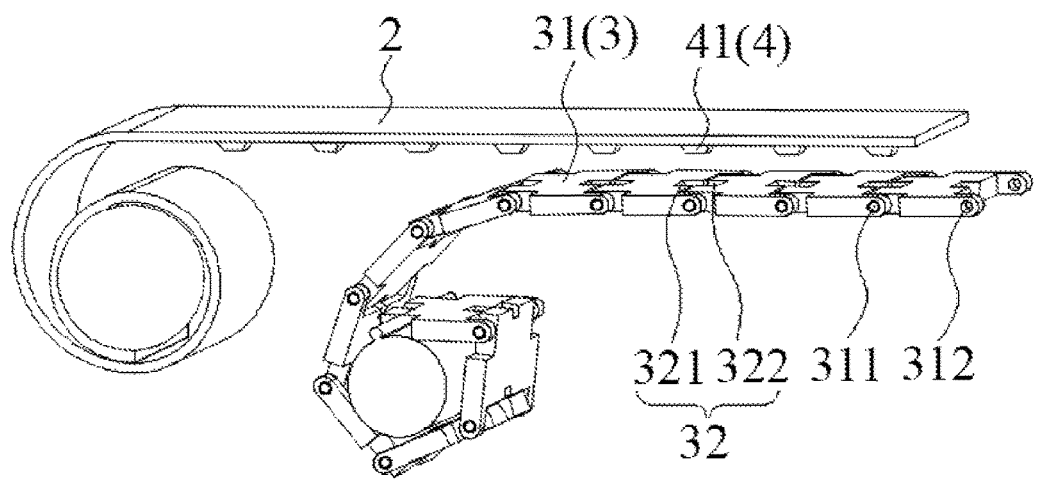
FIG. 4 illustrates an exploded view of a flexible display panel and a supporting structure according to various embodiments of the present disclosure.
Figure 5:
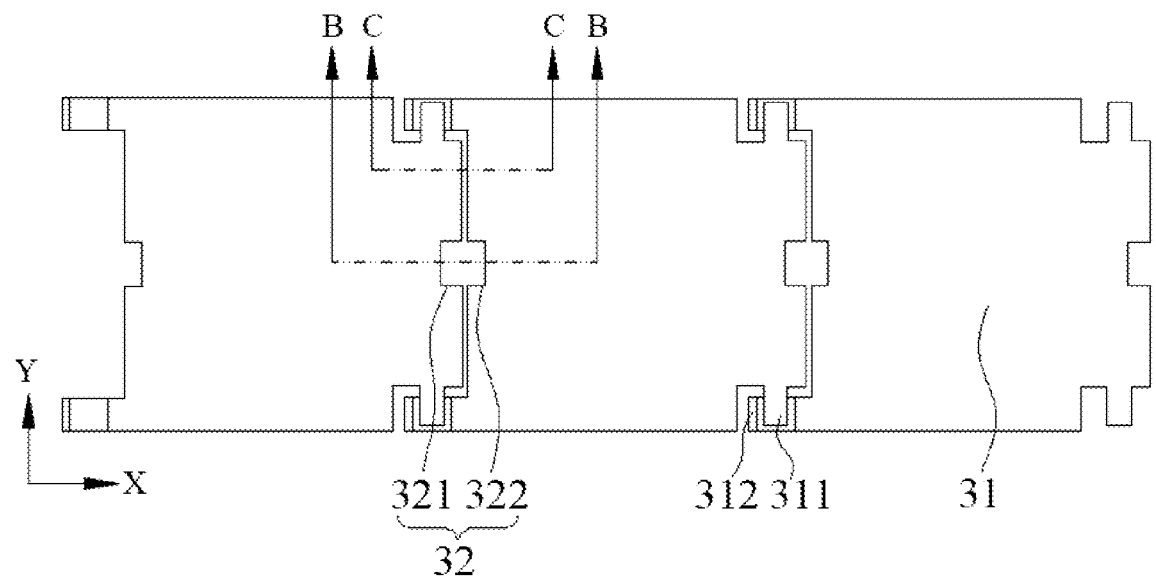
FIG. 5 illustrates a top view of a supporting structure according to various embodiments of the present disclosure.

Referring to FIGS. 4-5, FIG. 4 illustrates an exploded view of the flexible display panel 2 and the supporting structure 3 according to various embodiments of the present disclosure; and FIG. 5 illustrates a top view of the supporting structure 3 according to various embodiments of the present disclosure. In order to realize the relative rotation between adjacent supporting plates 31 in the rolled state, one of the two adjacent supporting plates 31 may be disposed with a rotating axle 311, the other one of the two adjacent supporting plates 31 may be disposed with a sleeve 312, and the two adjacent supporting plates 31 may be correspondingly connected through the rotating axle 311 and the sleeve 312. That is, the two adjacent supporting plates 31 may be rotatably connected through the rotating axle 311 and the sleeve 312. As a result, in the rolled state, the plurality of supporting plates 31 may be curled plate by plate to be rolled in the hollow space S1, thereby reducing the space occupied by the supporting structure 3. Optionally, in order to prevent excessive friction from affecting the rotation of adjacent supporting plates 31, lubricating oil may be coated on the mating surfaces of adjacent supporting plates 31. In addition, in order to prevent the usage of lubricating oil from polluting the flexible display panel 2, the sleeve 312 may be configured as a Teflon sleeve. Furthermore, disposing a self-lubricating coating on the outer surface of the rotating axle 311 or the inner surface of the sleeve 312 may also be a mean to avoid contamination while using lubricant.

Figure 6:
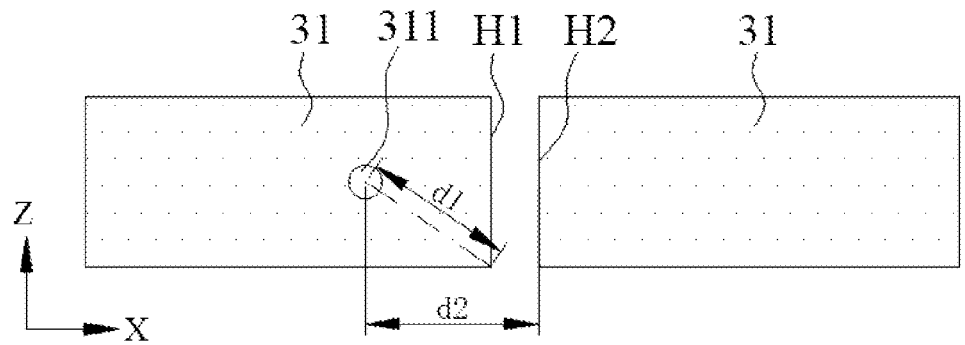
FIG. 6 illustrates a cross-sectional view of a supporting structure along a C-C direction in FIG. 5.

Referring to FIG. 6, FIG. 6 illustrates a cross-sectional view of the supporting structure 3 along a C-C direction in FIG. 5. Two opposite sides of two adjacent supporting plates 31 are the first surface H1 and the second surface H2, respectively, where the first surface H1 is a side surface of the supporting plate 31 provided with the rotating axle 311, and the second surface H2 is a side surface opposite to the first surface H1. When two adjacent supporting plates 31 relatively rotate around the rotating axle 311, the distance between each point on the first surface H1 and the center of the rotating axle 311 is the rotation radius of the point. To ensure that there is no mutual interference between two adjacent supporting plates 31, the rotation radius of each point on the first surface H1 should be less than the distance between the second surface H2 and the center of the rotating axle 311 along the first direction X.

It can be understood that when the first surface H1 and the second surface H2 are both configured as flat surfaces, the position with the largest rotation radius on the first surface H1 may be located at two ends of the first surface H1 along the third direction Z, the distance between a point (i.e., one end of the first surface) and the center of the rotating axle 311 is d1, and the distance between the second surface H2 and the center of the rotating axle 311 along the first direction X is d2. At this point, in order to avoid the interference between two adjacent supporting plates 31, it is necessary to satisfy that d2 is greater than d1 to ensure sufficient rotation space. However, when d2 is greater than d1, the tolerance between two adjacent supporting plates 31 may also increase. In the present disclosure, since the supporting structure 3 is unfolded, the two adjacent supporting plates 31 also need to maintain a certain level. Therefore, the tolerance requirement is relatively high, and it is difficult to solve the interference problem by increasing the distance between two adjacent supporting plates 31, that is, by increasing the magnitude of d2. Meanwhile, in order to improve the strength of the supporting plates 31, the length of the sleeve 312 along the first direction X may not be too long, which may cause the distance between the rotating axle 311 and the first surface H1 along the first direction X to be shorter, thereby further increasing the interference problem of two adjacent supporting plates 31.

Figure 7:
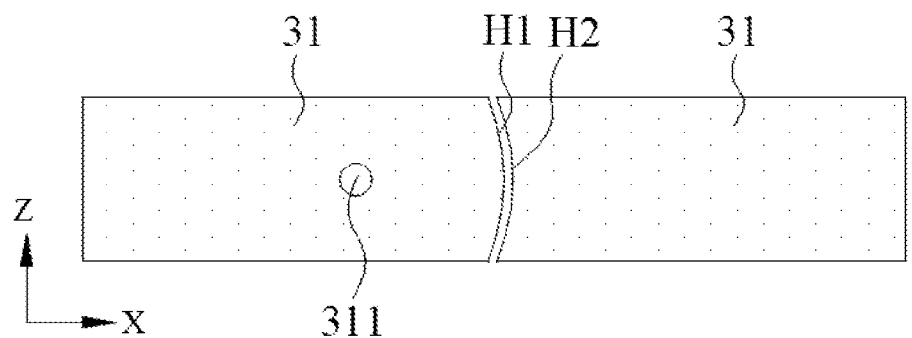
FIG. 7 illustrates another cross-sectional view of a supporting structure along a C-C direction in FIG. 5.

Referring to FIG. 7, FIG. 7 illustrates another cross-sectional view of the supporting structure 3 along a C-C direction in FIG. 5. In order to avoid interference between two adjacent supporting plates 31 when the tolerance requirement is high, one of two opposite sides of the two adjacent supporting plates 31 may be a convex arc surface, the other one of the two opposite sides may be a concave arc surface, and the arcs of the convex arc surface and the concave arc surface may be equal to each other. By setting one of the first surface H1 and the second surface H2 as a convex arc surface and the other one as a concave arc surface, when two adjacent supporting plates 31 rotate, the distance between each point on the first surface H1 and the center of the rotating axle 311 during rotation may be less than the distance d2 between the second surface H2 and the center of the rotating axle 311 through the coordinated rotation of the convex arc surface and the concave arc surface, without increasing the magnitude of d2. It can ensure higher tolerance requirement, avoid the interference between two adjacent supporting plates 31, and improve the stability of the rolling of the supporting structure 3. The centers of the convex arc surface H1 and the concave arc surface H2 may be the center of the rotating axle 311, and the arcs of the convex arc surface H1 and the concave arc surface H2 may be equal to each other. Therefore, when two adjacent supporting plates 31 are relatively rotated through the rotating axle 311 and the sleeve 312, the convex arc surface H1 and the concave arc surface H2 may also be rotated in a coordinated manner, which may further improve the stability of the rolling of the supporting structure 3. In addition, when two adjacent supporting plates 31 rotate relatively, their opposite contact surfaces may also provide a certain supporting force to reduce the force between the rotating axle 311 and the sleeve 312, which may further improve the reliability of the supporting structure 3.

Referring to FIGS. 4-5, considering that the supporting structure 3 is configured as the plurality of relatively rotatable supporting plates 31 in embodiments of the present disclosure, in order to realize that the locking part 4 can dynamically lock the relative rotation of the supporting plates 31 with the unfolding of the supporting structure 3 in the unfolded state, the locking groove 32 may be formed between two adjacent supporting plates 31 in one embodiment. In the unfolded state, the locking groove 32 may be coupled with the corresponding locking part 4 to flatly support the flexible display panel 2. That is, in the unfolded state, the plurality of supporting plates 31 may be unfolded plate by plate, and the relative rotation between two adjacent supporting plates 31 may be limited by coupling the locking part 4 to the locking groove 32 between two adjacent supporting plates 31. Therefore, in the unfolded state, the portion of the supporting structure 3 extending out of the main body structure 1 may not be bent, which ensures that the supporting structure 3 can flatly support the flexible display panel 2.

Referring to FIGS. 4-5, for example, a first groove portion 321 and a second groove portion 322 may be respectively formed on the opposite edges of two adjacent supporting plates 31; and the first groove portion 321 and the second groove portion 322 may be matched to form the locking groove 32. The relative rotation of the first groove portion 321 and the second groove portion 322 may be limited by coupling the locking part 4 to the first groove portion 321 and the second groove portion 322, which may limit the relative rotation between two adjacent supporting plates 31 and ensure that the supporting structure 3 can flatly support the flexible display panel 2 in the unfolded state.

It should be noted that the locking part 4 is disposed to be coupled with the locking groove 32 to limit the relative rotation between adjacent supporting plates 31. The locking part 4 may be a gas bag disposed in the locking groove 32. The gas bag may be inflated when the supporting structure 3 extends out of the hollow space S1, and the gas bag may be deflated when the supporting structure 3 is rolled in the hollow space S1. The locking part 4 may also be configured as a filler filled in the locking groove 32, and a heating device may be disposed at the opening of the main body structure 1; when the supporting structure 3 extends out of the hollow space S1, the filler may be heated to be expanded; and when the supporting structure 3 is rolled in the hollow space S1, the filler may be cooled to be shrunk. The locking part 4 may also be configured as a plurality of blocks spaced apart; when the supporting structure 3 extends out of the hollow space S1, the blocks may be coupled with the locking grooves 32; and when the supporting structure 3 is rolled in the hollow space S1, the blocks may be removed from the locking grooves 32, thereby realizing the switch of the supporting structure 3 between two states. It should be noted that embodiments of the present disclosure may only show the drawing in which the locking parts 4 are configured as blocks. However, the locking parts 4 may also be configured in various forms according to the actual structure of the flexible display apparatus, which may not be limited herein according to various embodiments of the present disclosure.

Referring to FIGS. 3-4, the locking parts 4 may be exemplarily configured as blocks as the following. The locking parts 4 may include protrusion portions 41 formed by freely extending along the direction from the back side of the flexible display panel 2 to the display surface away from the flexible display panel 2, and the protrusion portions 41 may be matched with the locking grooves 32. In the unfolded state, the flexible display panel 2 and the supporting structure 3 may simultaneously extend out of the main body structure 1, and the flexible display panel 2 may drive the protrusion portions 41 to be coupled with the locking grooves 32, such that it may ensure that the flat supporting structure 3 is formed when the flexible display panel 2 extends out of the main body structure 1, thereby realizing the stable support of the flexible display panel 2. In the rolled state, the flexible display panel 2 and the supporting structure 3 may be synchronously rolled in the main body structure 1. At this point, the flexible display panel 2 may drive the protrusion portions 41 to disengage from the locking grooves 32. In such way, the supporting plates 31 may be relatively rotated, and the supporting structure 3 may be rolled in the hollow space S1, thereby realizing the switch of the supporting structure 3 between two states.

Figure 8:
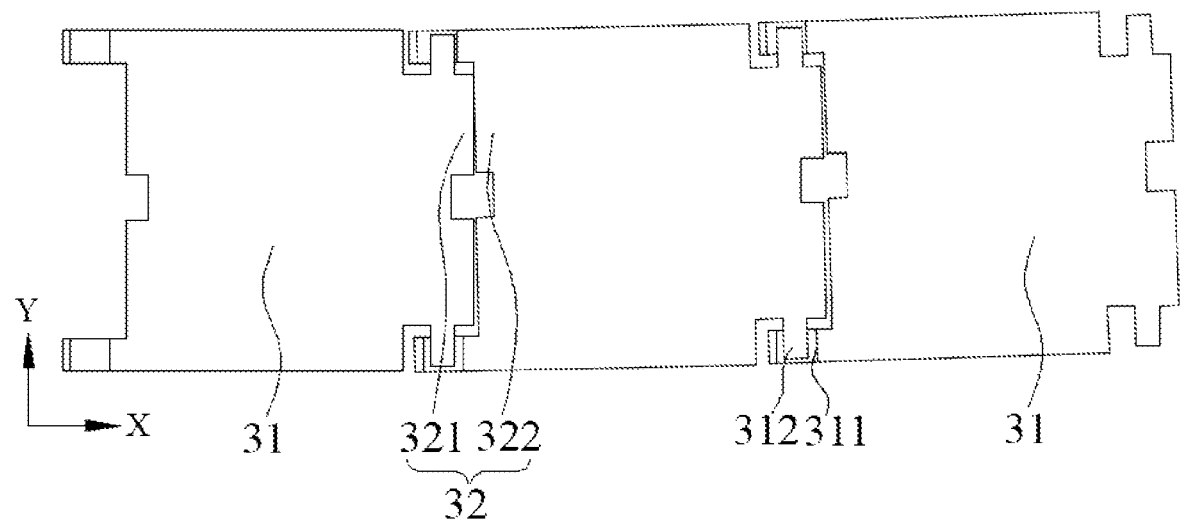
FIG. 8 illustrates a schematic of a misaligned supporting structure according to various embodiments of the present disclosure.

Referring to FIG. 8, it should be understood that when the supporting structure 3 is unfolded, although the locking part 4 can limit the relative rotation of adjacent supporting plates 31, the positions of the supporting plates 31 in the horizontal plane may have a certain deviation when a certain matching error is between the rotating axle 311 and the sleeve 312 of two adjacent supporting plates 31, which may be inconvenient to realize the coupling of the locking part 4 and the locking groove 32 and the stable support of the supporting structure 3.

Referring to FIG. 5, in some optional embodiments, when an interference fit is adopted between the locking parts 4 and the locking grooves 32, in order to realize the stable coupling of the locking parts 4 and the locking grooves 32, all locking grooves 32 may be arranged in a same straight line along the first direction X, and the straight line may pass through the center points of all supporting plates 31. That is, the locking parts 4 and all locking grooves 32 may be arranged along a same straight line, and the straight line may pass through the center points of all supporting plates 31. On the one hand, since the center position of each supporting plate 31 is relatively stable, when the flexible display panel 2 and the supporting structure 3 are unfolded, it may ensure that the locking part 4 can be stably coupled with the locking groove 32 when the locking part 4 and the locking groove 32 adopt an interference fit, which may avoid the case where the locking part 4 and the locking groove 32 have a large position deviation and cannot be coupled with each other when the position of the supporting plate 31 is deviated in the horizontal plane. On the other hand, after the coupling of the locking part 4 and the locking groove 32 is realized, since the locking part 4 and the locking groove 32 adopt an interference fit, the interference may limit the deviation between the rotating axle 311 and the sleeve 312 of two adjacent supporting plates 32, thereby ensuring the stable support of the supporting structure 3.

Figure 9:
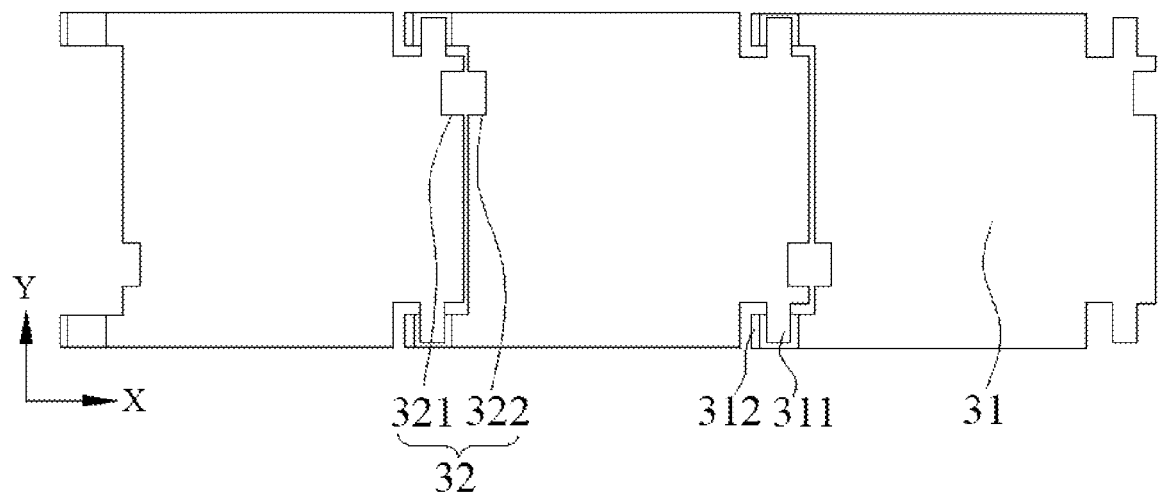
FIG. 9 illustrates a top view of another supporting structure according to various embodiments of the present disclosure.

Referring to FIG. 9, FIG. 9 illustrates a top view of another supporting structure 3 according to various embodiments of the present disclosure. In other optional embodiments, when the locking part 4 and the locking groove 32 adopt a clearance fit, in order to realize the stable coupling of the locking part 4 and the locking groove 32, the locking groove 32 may be disposed adjacent to any side of two opposite sides of the supporting plate 31 along the second direction Y; and two adjacent locking grooves 32 may be disposed adjacent to different sides of the supporting plate 31 along the first direction X, where the second direction Y may be perpendicular to the first direction X. That is, two adjacent locking grooves 32 may be respectively disposed on two sides of the supporting plate 31 along the second direction Y. Therefore, on the one hand, when the rotating axle 311 and the sleeve 312 of two adjacent supporting plates 31 have a certain matching deviation, since the locking part 4 and the locking groove 32 adopt a clearance fit, the clearance fit may ensure that the locking part 4 can still be coupled with the locking groove 32; on the other hand, after the coupling of the locking part 4 and the locking groove 32 is realized, since two adjacent locking grooves 32 are respectively disposed on two sides of the supporting plate 31 along the second direction Y, once there is an deviation between the rotating axle 311 and the sleeve 312, the coupling between the locking groove 32 and the locking part 4 disposed on two sides may also resist partial deviation force in the horizontal plane, which may limit the deviation of the supporting plate 31 in the horizontal plane and ensure the stable coupling of the locking part 4 and the locking groove 32. In addition, as shown in FIG. 9, when the centers of the locking grooves 32 are not located on a same straight line, the centers of the protrusion portions 41 may not located on the same straight line along the first direction X, thereby achieving the matching with the locking groove 32. Meanwhile, when the protrusion portions 41 are disposed on the back side of the flexible display panel 2 and rolled together with the flexible display panel 2 in the hollow space S1, in order to avoid stress aggregation of the flexible display panel 2 caused by the protrusion portions 41 when being rolled, the centers of the protrusion portions 41 may not be located on the same straight line to avoid damage to the flexible display panel 2.

Figure 10:
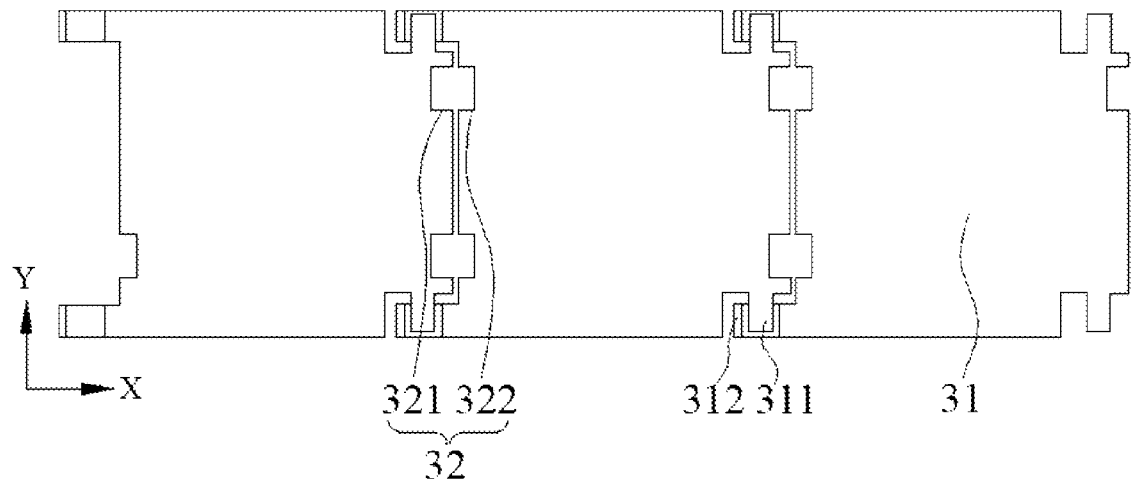
FIG. 10 illustrates a top view of another supporting structure according to various embodiments of the present disclosure.

Referring to FIG. 10, FIG. 10 illustrates a top view of another supporting structure 3 according to various embodiments of the present disclosure. In some other optional embodiments, when the locking part 4 and the locking groove 32 adopt a clearance fit, the locking grooves 32 may be disposed on two opposite sides of the supporting plate 31 along the second direction Y. By disposing the locking grooves 32 on two sides of the supporting plate 31 along the second direction Y, even if the locking groove 32 on one side is damaged by the deviation force in the horizontal plane, the locking groove 32 and the locking part 4 on the other side may be coupled to limit the deviation of adjacent supporting plate 31, thereby improving the reliability of the flexible display apparatus.

Optionally, since the displacement of the supporting plate 31 in the horizontal plane mainly depends on the assembly accuracy of the rotating axle 311 and the sleeve 312, under the condition that the assembly gap between the rotating axle 311 and the sleeve 312 remains unchanged, the longer the matching size of the rotating axle 311 and the sleeve 312 along the second direction Y is, the smaller the deviation of the supporting plate 31 along the first direction X is. Therefore, the matching size of the rotating axle 311 and the sleeve 312 along the second direction Y may also be appropriately increased to ensure the stable engagement of the locking part 4 and the locking groove 32.

Referring to FIGS. 3-4, in order to facilitate the coupling of the protrusion portion 41 with the locking groove 32, the cross-sectional area of the protrusion portion 41 along its extending direction may be gradually tapered from the connecting end connected to the back surface to its free end. That is, the cross-sectional area of the protrusion portion 41 along the third direction Z may gradually decrease from the end adjacent to the flexible display panel 2 to the end away from the flexible display panel 2. On the one hand, the alignment area of the protrusion portion 41 at the end away from the flexible display panel 2 may be smaller than the alignment area of the end adjacent to the flexible display panel 2, thereby facilitating the alignment of the protrusion portion 41 and the locking groove 32. On the other hand, when aligning the protrusion portion 41 with the locking groove 32, the tapered surface of the protrusion portion 41 may play a certain guiding role, thereby facilitating the coupling of the protrusion portion 41 and the locking groove 32.

Figure 11:
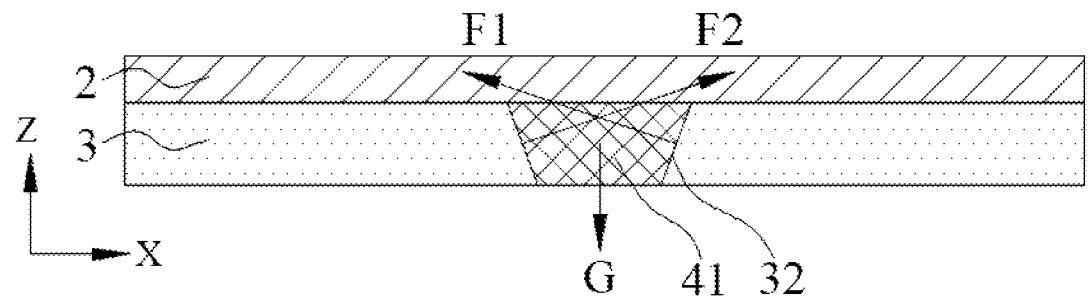
FIG. 11 illustrates a cross-sectional view of a supporting structure along a B-B direction in FIG. 5.

Referring to FIG. 11, FIG. 11 illustrates a cross-sectional view of the supporting structure 3 along a B-B direction in FIG. 5. Corresponding to the protrusion portion 41, the opening area of the locking groove 32 along the third direction Z may gradually decrease from the end adjacent to the flexible display panel 2 to the end away from the flexible display panel 2. The shape and size of the locking groove 32 may be configured according to the shape and size of the protrusion portion 41. Therefore, it may avoid that after the protrusion portion 41 and the locking groove 32 are coupled, the gap between the protrusion portion 41 and the locking groove 32 may be excessively large to cause the rotation of adjacent supporting plates 31.

As shown in FIG. 11, optionally, the cross section of the protrusion portion 41 along the extending direction may include at least one of a triangle, a trapezoid, and a semicircle. Corresponding to the protrusion portion 41, the opening section of the locking groove 32 along the extending direction may include at least one of a triangle, a trapezoid, and a semicircle, thereby ensuring the coupling of the protrusion portion 41 and the locking groove 32. It should be understood that the shapes of the protrusion portion 41 and the locking groove 32 may be adjusted according to the actual structure of the flexible display panel 2 and the supporting structure 3. Embodiments of the present disclosure may only show the drawings where the protrusion portion 41 is a trapezoidal body, which may not be understood as the limitation of the protection scope of the present disclosure.

Referring to FIG. 11, the protrusion portion 41 as a trapezoidal body may be taken as an example for description. Along the third direction Z, the cross section of the locking groove 32 may be an inverted trapezoid, and the third direction Z may be perpendicular to the first direction X. Corresponding to the locking groove 32, along the third direction Z, the cross section of the protrusion portion 41 may also be an inverted trapezoid. When the protrusion portion 41 is coupled with the locking groove 32, the supporting plates 31 on adjacent two sides may bear the gravity G of the protrusion portion 41 to generate the first supporting force F1 and the second supporting force F2 for supporting the protrusion portion 41. The cross section of each of the protrusion portion 41 and the locking groove 32 is a trapezoid, the directions of the first supporting force F1 and the second supporting force F2 are perpendicular to the inclined surfaces on both sides of the inverted trapezoid. Therefore, the sum of the components of the first supporting force F1 and the second supporting force F2 along the third direction Z may be substantially equal to the gravity G of the protrusion portion 41, and the protrusion portion 41 may reach a force balance. When the gravity G of the protrusion portion 41 is constant, the inclined angles of the inclined surfaces may affect the magnitudes of the first supporting force F1 and the second supporting force F2. Therefore, the inclined angle of the inclined surface can be used to ensure that the locking groove 32 can stably support the protrusion portion 41.

Optionally, the bottom angle of the inverted trapezoidal cross section of the locking groove 32 and the protrusion portion 41 may be 45°~85°. It should be understood that if the bottom angle is excessively large, the first supporting force F1 and the second supporting force F2 may be large, resulting in that excessive force may be between the protrusion portion 41 and the locking groove 32 and the end of the protrusion portion 41 away from the flexible display panel 2 may bear a greater force, so that the protrusion portion 41 may be not uniformly stressed to be easily damaged; if the bottom angle is excessively small, the force between the protrusion portion 41 and the locking groove 32 may be small, which may easily cause the protrusion portion 41 to separate from the locking groove 32 and affect the supporting effect of the supporting structure 3. Therefore, the cross-sectional shape and angle of the locking groove 32 and the protrusion portion 41 can be adjusted according to the actual situation, which may not be limited herein.

Furthermore, according to the above analysis, when the supporting structure 3 is pushed and pulled along the first direction X, the supporting plates 31 on both sides of the protrusion portion 41 may generate a pressing force on the protrusion portion 41. The direction of the pressing force may be same as the first supporting force F1 and the second supporting force F2, respectively. When the component of the pressing force along the third direction Z is greater than the gravity G of the protrusion portion 41, the protrusion portion 41 may move along the third direction Z. In addition, when the flexible display apparatus 100 is turned upside down, or when the flexible display apparatus 100 is moved at various angles, the protrusion portion 41 may easily move relative to the locking groove 32 along the third direction Z, which may result in that the protrusion portion 41 is separated from the locking groove 32 and the flexible display panel 2 is separated from the supporting structure 3.

In order to solve the above-mentioned problems, on the one hand, the contact surface of at least one of the locking groove 32 and the protrusion portion 41 can be set as a surface with a relatively high friction coefficient. For example, the surface of the protrusion portion 41 may be sandblasted, or the protrusion portion 41 may be made of a material with a relatively high friction coefficient such as rubber. In addition, the inside of the locking groove 32 may also be disposed with an element to-be-attracted, and the protrusion portion 41 may have magnetism, such that the protrusion portion 41 can be attracted in the locking groove 32. Therefore, it may avoid that in the unfolded state or when the flexible display apparatus 100 is moved, the protrusion portion 41 may move relative to the locking groove 32 along the third direction Z, which affects the supporting effect of the supporting structure 3 on the flexible display panel 2. On the other hand, a stopper (not shown) may be disposed on at least one of two adjacent supporting plates 31, which is used to limit the rotation of the supporting plate 31 along the side facing away from the rolling direction. In such way, it may avoid that the protrusion portion 41 is pressed to cause the protrusion portion 41 to be separated from the locking groove 32, thereby preventing the flexible display panel 2 from being separated from the supporting structure 3.

It should be understood that when the flexible display panel 2 and the supporting structure 3 are unfolded along the first direction X, if the fit tolerance of the protrusion portion 41 and the locking groove 32 is excessively large, it may cause a certain relative rotation between adjacent supporting plates 31. As a result, as the flexible display panel 2 and the supporting structure 3 are pulled out, the accumulated displacement deviation may gradually increase, such that the protrusion portion 41 at the rear thereof may not be coupled with the locking groove 32. Therefore, when the protrusion portion 41 is configured as a trapezoidal body, in order to ensure that each protrusion portion 41 can be coupled to the locking groove 32 between two adjacent supporting plates 31, on the one hand, the protrusion portion 41 can have an interference fit with the locking groove 32. For example, the locking part 4 can be made of hard rubber, and the relative rotation between adjacent supporting plates 31 may be limited by the interference fit of the locking part 4 and the locking groove 32, thereby reducing the displacement deviation as possible. On the other hand, a high-precision carving process may be used to modify at least a part of the locking groove 32 on the side of the supporting structure 3 adjacent to the main structure 1. Therefore, even if the accumulated position deviation of the flexible display panel 2 and the supporting structure 3 gradually increases as the flexible display panel 2 and the supporting structure 3 are pulled out, a part of locking grooves 32 on the side adjacent to the main body structure 1 may still be stably coupled with the protrusion portions 41 and the position deviation of such part may be corrected, which may ensure that the supporting structure 3 may still support the flexible display panel 2 flatly.

Figure 12:
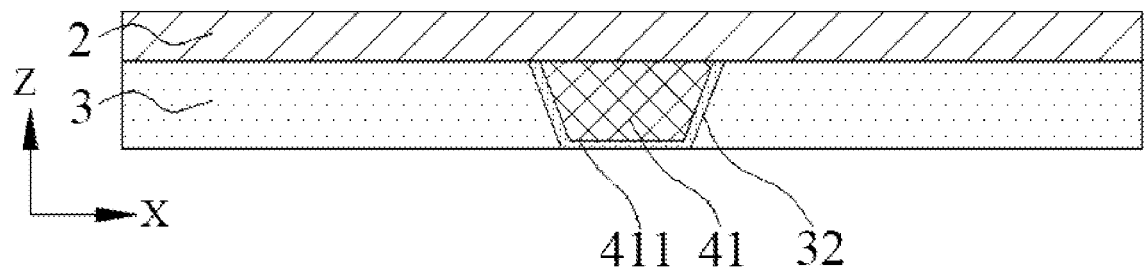
FIG. 12 illustrates another cross-sectional view of a supporting structure along a B-B direction in FIG. 5.

Referring to FIG. 12, FIG. 12 illustrates a cross-sectional view of another supporting structure 3 along the B-B direction in FIG. 5. Another solution is to dispose a gap filling portion 411 on at least a part of the outer surface of the protrusion portion 41. When the supporting structure 3 extends out of the hollow space S1, the gap filling portion 411 may be expanded to fill the matching gap between the protrusion portion 41 and the locking groove 32 to ensure the coupling of the protrusion portion 41 and the locking groove 32. When the supporting structure 3 is rolled in the hollow space S1, the gap filling portion 411 may be contracted to ensure that the protrusion portion 41 can be separated from the locking groove 32, thereby realizing the switch of the supporting structure 3 between two states.

Optionally, the gap filling portion 411 may include at least one of an inflatable gas bag, silica gel, and sponge. The protrusion portion 41 may be disposed with air holes, and the gap filling portion 411 may be expanded or contracted by inflation. By disposing the gap filling portion 411 on at least the outer surface of the protrusion portion 41, on the one hand, it can ensure that the supporting structure 3 can flatly support the flexible display panel 2 and avoid wrinkling or bending of the flexible display panel 2; on the other hand, the gap filling portion 411 can also achieve a certain buffer effect, thereby avoiding the protrusion portion 41 and the locking groove 32 from impacting each other and being damaged, and improving the service life of the flexible display apparatus 100.

Referring to FIG. 3, in order to ensure that the supporting structure 3 and the flexible display panel 2 can be stably rolled in the hollow space S1, the flexible display apparatus 100 provided in embodiments of the present disclosure may further include a rolling axle assembly 5 including the first rolling axle 51 and the second rolling axle 52. The rolling axle assembly 5 may be disposed in the hollow space S1, and the first rolling axle 51 and the second rolling axle 52 may be respectively rotatably connected with the main body structure 1. In the unfolded state, the supporting structure 3 and the flexible display panel 2 may partially extend out of the hollow space S1, and the locking groove 32 at least partially extending out of the hollow space S1 may be correspondingly coupled with the locking part 4. The first rolling axle 51 and the second rolling axle 52 may be rotatably connected to the main body structure 1; and the flexible display panel 2 and the supporting structure 3 may be respectively rolled on the first rolling axle 51 and the second rolling axle 52; such that it may ensure that the flexible display panel 2 and the supporting structure 3 can be switched stably in the rolled state and the unfolded state.

As shown in FIG. 3, for example, in order to ensure that the locking groove 32 at least partially extending out of the hollow space S1 can be coupled with the locking part 4, a height difference may be between the first rolling axle 51 and the second rolling axle 52 along the third direction Z, which may reserve a coupling space between the locking groove 32 and the locking part 4. It should be understood that since the supporting structure 3 is disposed on one side of the flexible display panel 2 facing away from the display surface, the rolling axle of the flexible display panel 2 should be higher than the rolling axle of the supporting structure 3 along the third direction Z. Taking the flexible display panel 2 connected to the first rolling axle 51 and the supporting structure 3 connected to the second rolling axle 52 as an example for description, at this point, along the third direction Z, the first rolling axle 51 should be higher than the second rolling axle 52, which may ensure that the locking part 4 can be coupled with the locking groove 32.

Referring to FIG. 3, in some optional embodiments, the radius of the first rolling axle 51 may be equal to the radius of the second rolling axle 52. Therefore, when the flexible display panel 2 and the supporting structure 3 are stretched in the unfolded state, the first rolling axle 51 and the second rolling axle 52 may rotate synchronously and stably. On the one hand, it can facilitate the size design of the rolling axle assembly 5; and on the other hand, it can also facilitate the unfolding and rolling of the flexible display panel 2 and the supporting structure 3.

It should be understood that when the locking part 4 is disposed on one side of the flexible display panel 2 facing away from the display surface and is rolled on the first rolling axle 51 together with the flexible display panel 2, the locking part 4 may increase the thickness of the first rolling axle 51 after being rolled up, and may be easy to cause stress concentration of the flexible display panel 2 which may damage the flexible display panel 2.

Figure 13:
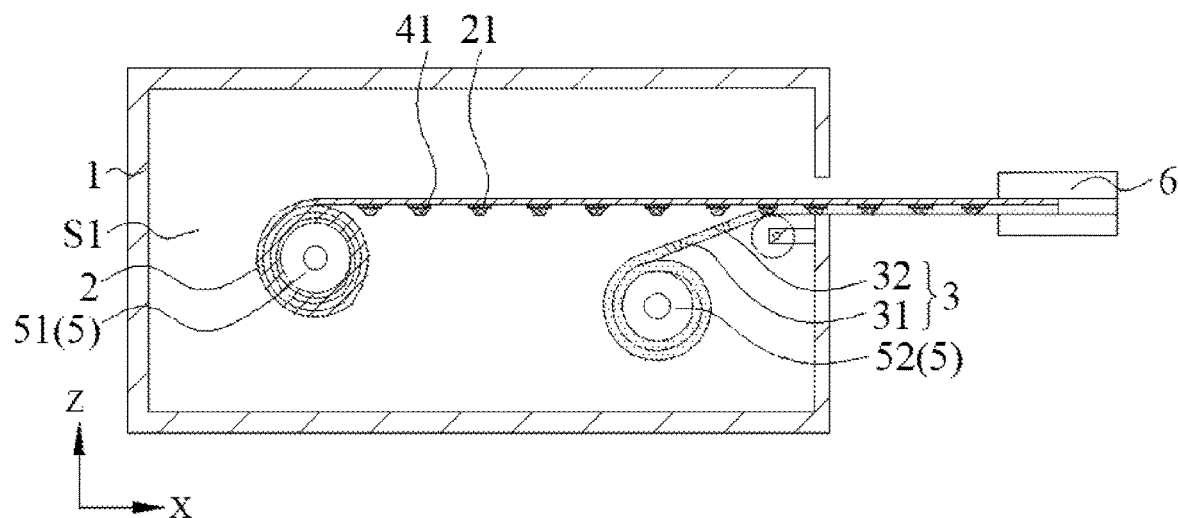
FIG. 13 illustrates another cross-sectional view of a flexible display apparatus along an A-A direction in FIG. 1.

Referring to FIG. 13, FIG. 13 illustrates a cross-sectional view of another flexible display apparatus 100 along the A-A direction in FIG. 1. In order to solve the above-mentioned problems, in addition to above-mentioned embodiments, the centers of the locking parts 4 may not be located on a same straight line, and the locking parts 4 and the flexible display panel 2 may be detachably connected. When the locking parts 4 and the flexible display panel 2 are detachably connected, the flexible display panel 2 may only be rolled on the first rolling axle 51 during the rolling process of the flexible display panel 2; and during the unfolding process, the locking parts 4 may be connected to the side of the flexible display panel 2 away from the display surface, such that the locking groove 32 at least partially extending out of the hollow space S1 may be coupled to the locking parts 4 correspondingly.

As shown in FIG. 13, in order to realize the detachable connection of the locking parts 4 and the flexible display panel 2, in some embodiments, a plurality of to-be-attracted elements 21 may be arranged spaced apart along the first direction X on the back side of the flexible display panel 2. The locking parts 4 may include a plurality of magnetic protrusion portions 41, and the protrusion portions 41 may correspondingly be attracted to the to-be-attracted elements 21. The to-be-attracted element 21 may be set as an iron sheet with a relatively thin thickness, and the protrusion portion 41 may be set as a permanent magnet. Therefore, when the flexible display panel 2 is rolled on the first rolling axle 51, the thickness of the first rolling axle 51 after rolling may not be increased. Meanwhile, when the flexible display panel 2 is stretched along the first direction X, the protrusion portions 41 may be attracted to the to-be-attracted elements 21 on the back side of the flexible display panel 2. Furthermore, when the flexible display panel 2 and the supporting structure 3 are unfolded, the protrusion portion 41 on the back side of the flexible display panel 2 may be coupled with the locking groove 32 correspondingly.

Figure 14:
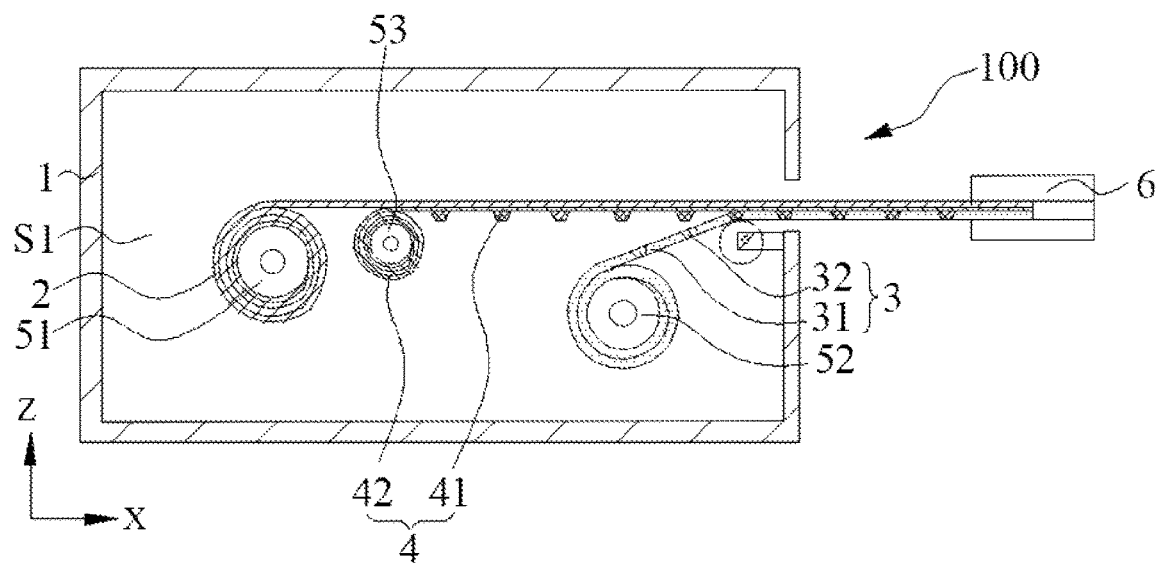
FIG. 14 illustrates another cross-sectional view of a flexible display apparatus along an A-A direction in FIG. 1.

Referring to FIG. 14, FIG. 14 illustrates a cross-sectional view of another flexible display apparatus 100 along the A-A direction in FIG. 1. In other optional embodiments, the rolling axle assembly 5 may further include a third rolling axle 53, and the locking part 4 may further include a connecting plate 42. The connecting plate 42 may be connected to the third rolling axle 53, and the protrusion portion 41 may be disposed on one side of the connecting plate 42 facing the supporting structure 3. The back side of the flexible display panel 2 may be arranged with a permanent magnet, and the connecting plate 42 may be arranged as a magnetic plate. When the flexible display panel 2 is stretched along the first direction X, the connecting plate 42 may be attracted to the back side of the flexible display panel 2, thereby driving the third rolling axle 53 to rotate; such that the connecting board 42 may move in the first direction X along with the flexible display panel 2. The connecting plate 42 is disposed with the protrusion portion 41 on the side facing the supporting structure 3, such that, when the flexible display panel 2 is pulled, the protrusion portion 41 on the connecting plate 42 may be driven to be coupled with the locking groove 32 on the supporting structure 3. Similarly, when rolling the flexible display panel 2, the connecting plate 42 may be separated from the flexible display panel 2 by rolling the connecting plate 42 on the third rolling axle 53, which may avoid that the protrusion portion 41 is rolled on the first rolling axle 51 along with the flexible display panel 2 and avoid increasing the rolling thickness of the first rolling axle 51.

In addition, due to actual use, some dust or impurities may enter the hollow space S1, which affects the normal operation of the supporting structure 3, the flexible display panel 2, and other components. In order to avoid the above problems, in some optional embodiments, the surface of the supporting structure 3 facing away from the flexible display panel 2 may be provided with a dustproof film. The dustproof film may be directly attached to the surface of the supporting structure 3 facing away from the flexible display panel 2 to save cost. The dustproof film can also be rolled in the hollow space S1, that is, the rolling axle assembly 5 may also be disposed with the fourth rolling axle. In the rolled state, the dustproof film may be rolled on the fourth rolling axle, and in the unfolded state, the dustproof film may be pulled out synchronously with the supporting structure 3. By setting the dustproof film in a separate rolling form, the dustproof film can first be removed by the dust removal device when it is rolled in the hollow space S1. For example, the sundries adsorbed on the surface of the dustproof film may be removed by blowing air or the like to prevent sundries from entering the flexible display apparatus 100.

Figure 15:
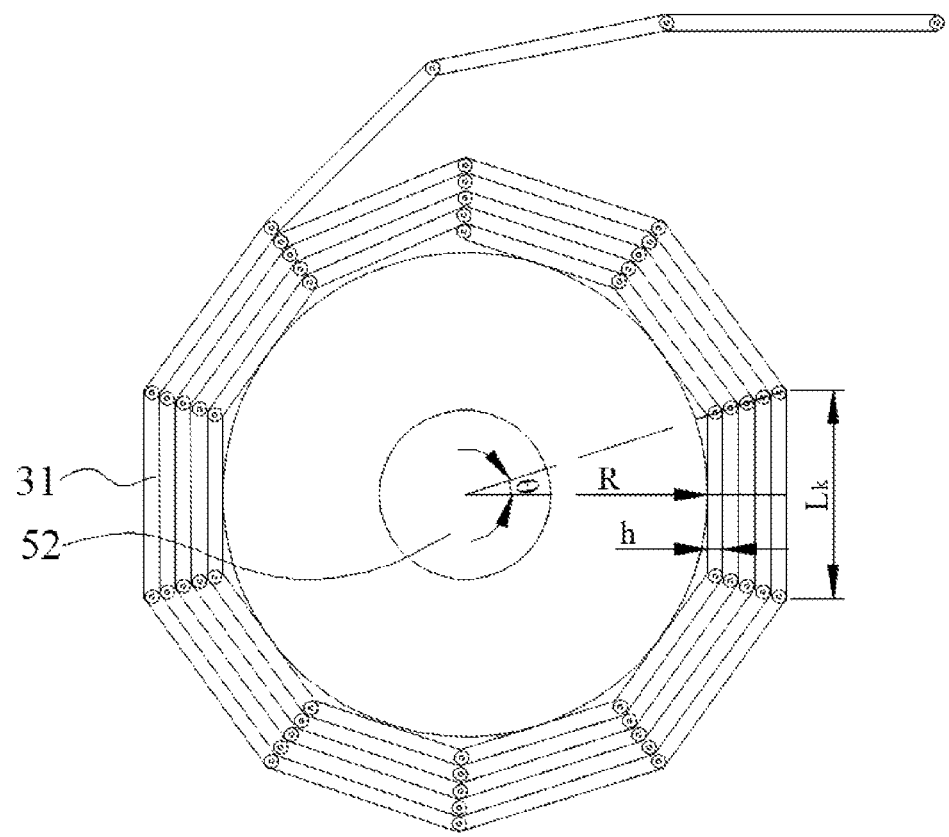
FIG. 15 illustrates a schematic of rolling supporting plates according to various embodiments of the present disclosure.

Referring to FIG. 15, FIG. 15 illustrates a schematic of rolling supporting plates 31 according to various embodiments of the present disclosure. When the supporting structure 3 is rolled by the second rolling axle 52, since the supporting structure 3 includes the plurality of rotatably connected supporting plates 31, in order to neatly roll the supporting plates 31 on the second rolling axle 52, the second rolling axle 52 may be rolled with N rounds of supporting plates 31 in some optional embodiments. The length $L_k$ of the supporting plate 31 at the k-th round may be less than the length $L_{k+1}$ of the supporting plate 31 at the k+1-th round; and the distance between two adjacent locking parts 4 fitted in the supporting plate 31 located at the k-th round may be equal to the length $L_k$ of the supporting plate 31, where $0 < k \leq N$. The rolling radius of each round supporting plate 31 is different; therefore, when the supporting structure 3 is rolled on the second rolling axle 52, if the lengths of the supporting plates 31 are all equal, the joints of adjacent supporting plates 31 between different rounds may be misaligned. On the one hand, the supporting structure 3 may be easy to wear after repeated rolling, which reduces the service life of the supporting structure 3; and on the other hand, it is not beneficial to the neat rolling of the supporting structure 3. Therefore, by making the length $L_{k+1}$ of the supporting plate 31 at the k+1 round greater than the length $L_k$ of the supporting plate 31 at the k-th round, and setting the lengths of the supporting plates 31 in different rounds reasonably, it may ensure that when the supporting structure 3 is rolled on the second rolling axle 52, the joints of adjacent supporting plates 31 between different rounds may be located on a same straight line, which may ensure the neat rolling of the supporting plates 31 and improve the service life of the supporting structure 3.

For example, the calculation for the length $L_k$ of the supporting plate 31 at the k-th round is as follows:

$$L_k = 2*(R+kh-h/2)*\tan\left(\frac{180°}{g}\right)$$

Where, R is the radius of the second rolling axle 52, h is the thickness of the supporting plate 31, and g is the number of the supporting plates 31 in one round. It can be understood that when the joints of adjacent supporting plates 31 between different rounds are located on a same straight line, the number of supporting plates 31 provided in each round may be same. Therefore, the length $L_k$ of the supporting plate 31 at the k-th round may be proportional to the distance from the center of the second rolling axle 52 to the supporting plate 31. When the number of rounds k where the supporting plate 31 is located, the radius R of the second rolling axle 52, the number g of the supporting plates 31 in one round, and the thickness h of the supporting plate 31 are determined, the length $L_k$ of the supporting plates 31 at the k-th round may be calculated.

Optionally, the length of the supporting plate 31 may be 0.01 mm to 3.0 mm, and its value may be designed according to the structural size of the flexible display apparatus, which may not be limited herein.

Figure 16:
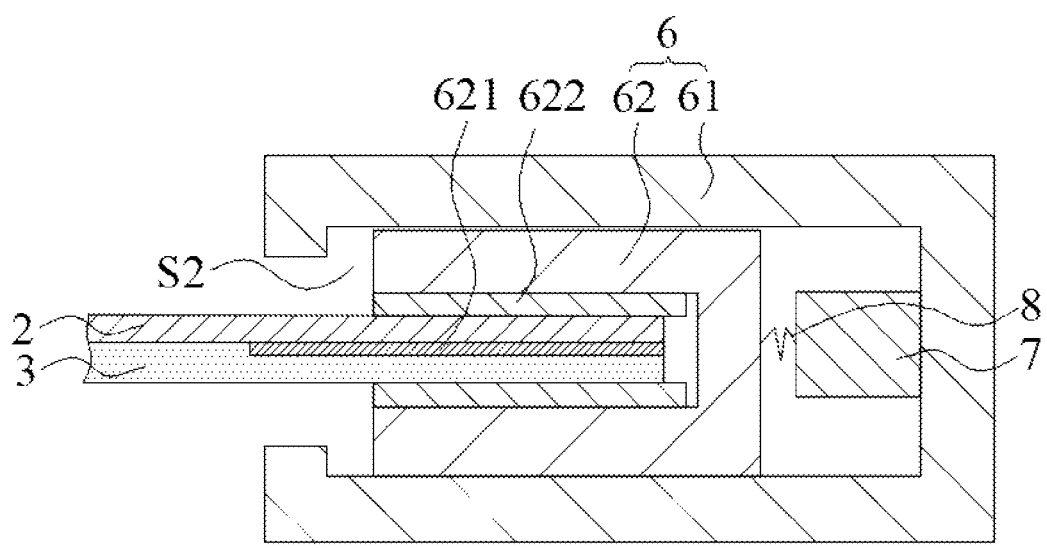
FIG. 16 illustrates a cross-sectional view of a pulling part according to various embodiments of the present disclosure.

Referring to FIG. 16, FIG. 16 illustrates a cross-sectional view of a pulling part 6 according to various embodiments of the present disclosure. In order to facilitate the movement of the ends of the flexible display panel 2 and the supporting structure 3 along the first direction X in the unfolded state, the flexible display apparatus 100 may further includes the pulling part 6. The pulling part 6 may include a housing 61 and a sliding part 62. The housing 61 may have a sliding rail, and the sliding part 62 may slide along the sliding rail. One end of each of the supporting structure 3 and the flexible display panel 2 extending out of the main body structure 1 may be connected to the sliding part 62 respectively. The pulling part 6 may move along the first direction X under the drive of an automatic control system, thereby driving the supporting structure 3 and the flexible display panel 2 connected to the pulling part 6 to move along the first direction X.

As shown in FIG. 16, furthermore, when using the pulling part 6 to pull the supporting structure 3, the supporting structure 3 or the flexible display panel 2 may be damaged due to excessive force. In order to avoid excessive pulling force of the pulling part 6 on the supporting structure 3 and the flexible display panel 2, in some optional embodiments, the flexible display apparatus 100 may further include a pulling force sensor 7. The pulling force sensor 7 may be fixed to the housing 61; and the pulling force sensor 7 may be connected to the sliding part 62 through an elastic part 8 to measure the pulling force received by the sliding part 62. The pulling part 6 includes the relatively slidable housing 61 and the sliding part 62, and an elastic part 8 is disposed between the housing 61 and the sliding part 62. Therefore, when the pulling part 6 drives the flexible display panel 2 and the supporting structure 3 to move along the first direction X through the sliding part 62, relative sliding may occur between the housing 61 and the sliding part 62 to drive the elastic part 8 to be deformed. The pulling force sensor 7 may measure the elastic force of the elastic part 8 to obtain the pulling force of the pulling part 6 on the flexible display panel 2 and the supporting structure 3. When the pulling force is excessively large, the pulling force sensor 7 may feedback an electrical signal to the automatic control system to adjust the rotation speed of the first rolling axle 51 and the second rolling axle 52, and the pulling force received by the flexible display panel 2 and the supporting structure 3 may be further reduced.

Figure 17:
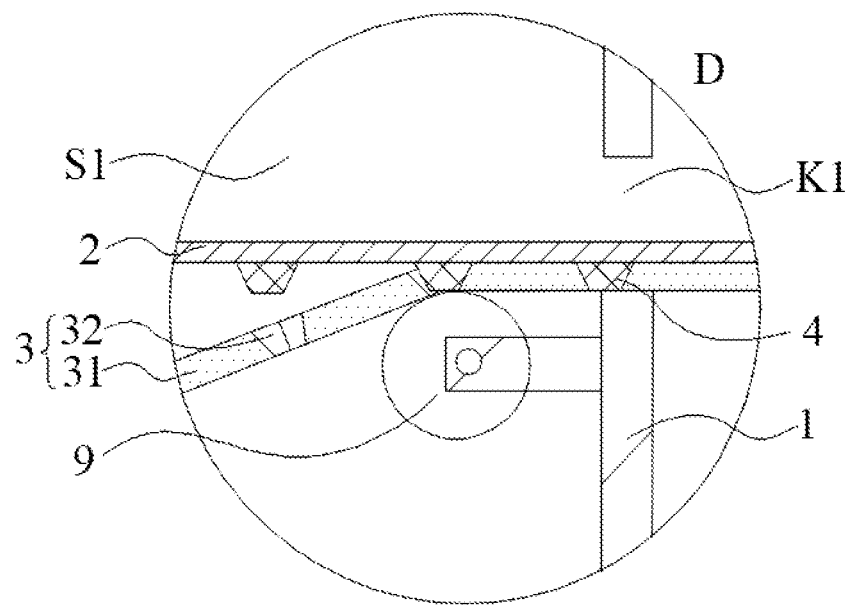
FIG. 17 illustrates an enlarged view of a flexible display apparatus at a location D in FIG. 3.

Referring to FIG. 17, in some optional embodiments, the end of the flexible display panel 2 connected with the pulling part 6 and the end of the supporting structure 3 connected with the pulling part 6 may be fixedly connected. That is, the sliding part 62 may include an accommodating cavity S2; the accommodating cavity S2 may include an adhesive 621 extending along the sliding direction of the sliding part 62; and the parts of the supporting structure 3 and the flexible display panel 2 extending into the accommodating cavity S2 may be respectively adhered to the opposite sides of the adhesive 621. The ends of the supporting structure 3 and the flexible display panel 2 extend into the accommodating cavity S2, and the parts extending into the accommodating cavity S2 are fixedly connected by the adhesive 621, which may ensure that the pulling part 6 may pull out the supporting structure 3 and the flexible display panel 2 simultaneously; meanwhile, the supporting structure 3 is attached to the end of the flexible display panel 2, such that it is also more convenient for the locking part 4 on the back side of the flexible display panel 2 to be coupled with the locking groove 32.

As shown in FIG. 16, furthermore, the sliding part 62 may further include a buffering part 622, the buffering part 622 may be disposed at least on the first surface of the accommodating cavity S2, and the first surface may be the surface opposite to the surface where the adhesive 621 adheres the supporting structure 3 and the flexible display panel 2 in the accommodating cavity S2. By providing the buffering part 622 on the surface where the supporting structure 3 and the flexible display panel 2 are connected in the accommodating cavity S2, the supporting structure 3 and the flexible display panel 2 may be prevented from being crushed. Optionally, the buffering part 622 may be configured as foam.

Referring to FIG. 17, FIG. 17 illustrates an enlarged view of a flexible display apparatus at a location D in FIG. 3. The supporting structure 3 includes the plurality of relatively rotatable supporting plates 31. Therefore, in order to facilitate the coupling of the locking groove 32 and the locking part 4 in the hollow space S1, the flexible display apparatus 100 may further include a fitting auxiliary part 9. The fitting auxiliary part 9 may be arranged in the hollow space S1, and the fitting auxiliary part 9 may at least be abutted against the side surface of the supporting structure 3 opposite to the flexible display panel 2, such that the locking part 4 and the locking groove 32 may be correspondingly fitted in the abutting position.

As shown in FIG. 17, meanwhile, the main body structure 1 may include an opening K1 for extending out the supporting structure 3 and the flexible display panel 2, and the fitting auxiliary part 9 may be disposed adjacent to the opening K1. That is, by disposing the fitting auxiliary part 9, it may ensure that the locking part 4 and the locking groove 32 can be coupled stably; and it also be convenient for the flexible display panel 2 and the supporting structure 3 to be pulled out from the opening K1 of the main body structure 1 after coupling.

Figure 18:
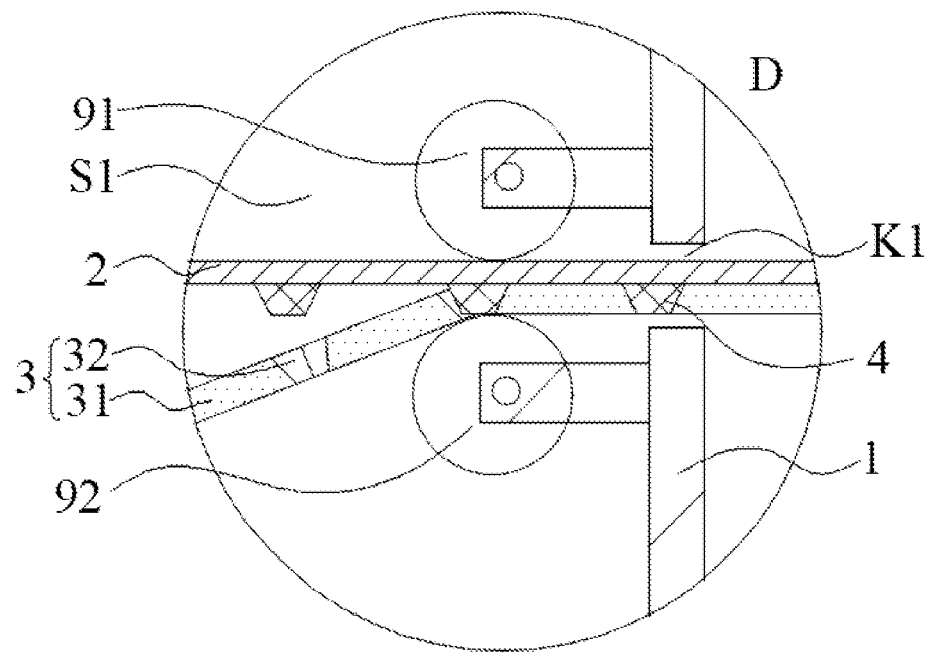
FIG. 18 illustrates another enlarged view of a flexible display apparatus at a location D in FIG. 3.

Referring to FIG. 18, FIG. 18 illustrates another enlarged view of a flexible display apparatus at the location D in FIG. 3. In order to further ensure that the locking part 4 can be stably coupled with the locking groove 32, the fitting auxiliary part 9 may include a first roller 91 and a second roller 92. Along the third direction Z, the first roller 91 and the second roller 92 may be respectively disposed on both sides of the opening K1. The first roller 91 may be in contact with the display surface of the flexible display panel 2, and the second roller 92 may be in contact with the side surface of the supporting structure 3 facing away from the flexible display panel 2. The second roller 92 may be abutted against the side of the supporting structure 3 away from the flexible display panel 2 to limit the movement of the locking groove 32 along the third direction Z, and the first roller 91 may be abutted against the side of the flexible display panel 2 away from the supporting structure 3 to limit the movement of the locking part 4 along the third direction Z, thereby being easier for coupling the locking part 4 with the locking groove 32 stably. In addition, by setting the fitting auxiliary part 9 as a roller, the frictional force between the second roller 92 and the supporting structure 3, and between the first roller 91 and the flexible display panel 2 may also be reduced, such that it may be easier to unfold the flexible display panel 2 and the supporting structure 3.

Figure 19:
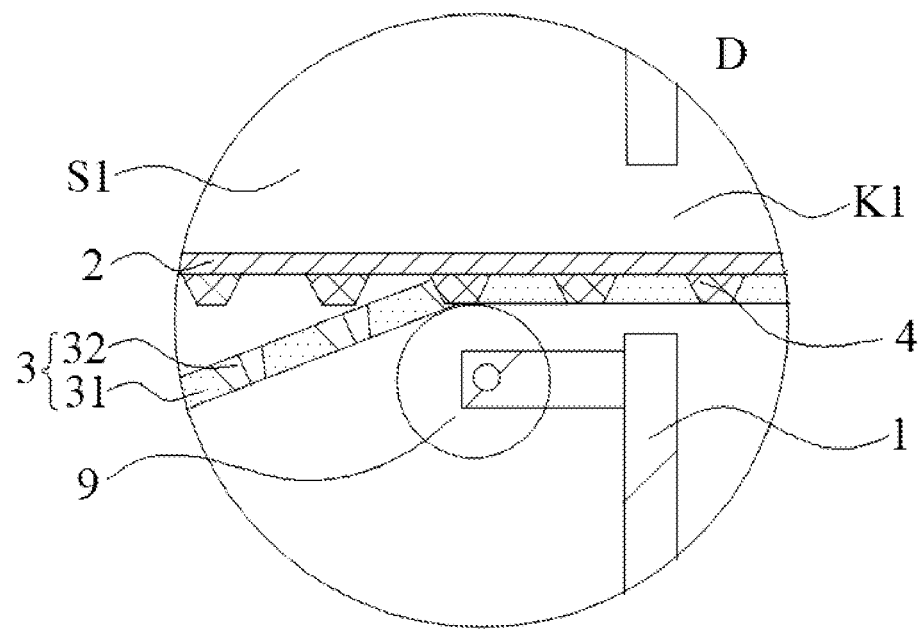
FIG. 19 illustrates another enlarged view of a flexible display apparatus at a location D in FIG. 3.

Referring to FIG. 19, FIG. 19 illustrates another enlarged view of a flexible display apparatus at a location D in FIG. 3. It should be understood that, in order to ensure that the supporting structure 3 can support the flexible display panel 2 flatly, the supporting plate 31 should be set as a rigid part; and the rigid supporting plate 31 may jump along the third direction Z when passing through the second roller 92, affecting the flexible display panel 2 and the supporting structure 3 to be pulled out from the opening K1. To solve the above problem, firstly, the size of the opening K1 along the third direction Z may be increased to facilitate the pulling out of the flexible display panel 2 and the supporting structure 3; secondly, the length of a single supporting plate 31 may also be reduced, such that, the vibration amplitude of the supporting plate 31 along the third direction Z may be reduced. However, reducing the length of a single supporting plate 31 may lead to an increase in the processing accuracy of the supporting plate 31 and increase the assembly difficulty between adjacent supporting plates 31, thereby increasing the cost of the flexible display apparatus.

Figure 20:
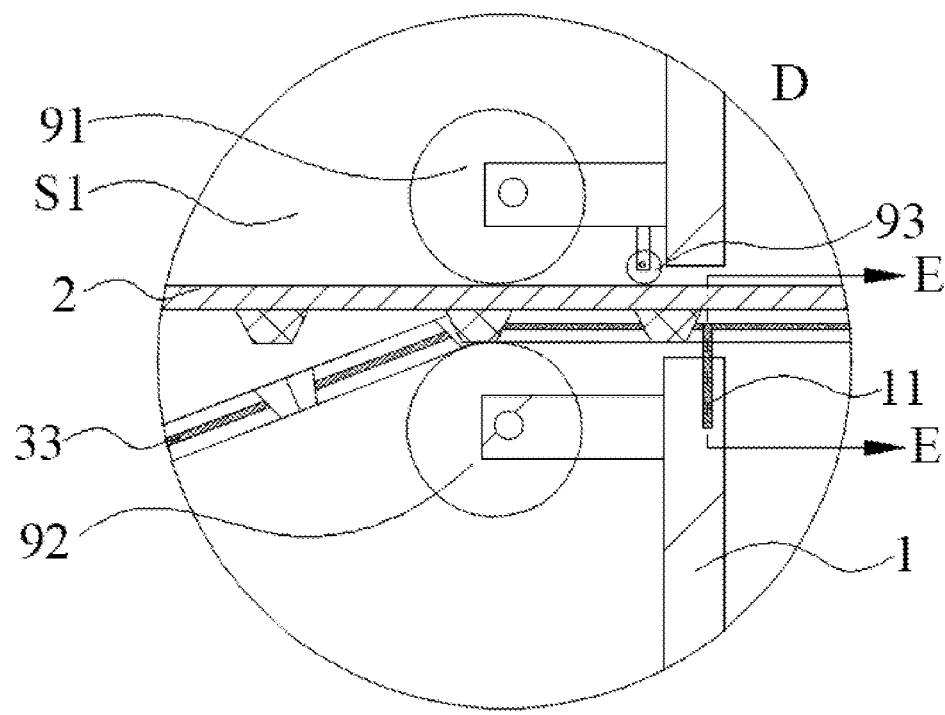
FIG. 20 illustrates another enlarged view of a flexible display apparatus at a location D in FIG. 3.

Referring to FIG. 20, FIG. 20 illustrates another enlarged view of a flexible display apparatus at a location D in FIG. 3. In order to solve the above problem, in some optional embodiments, the fitting auxiliary part 9 may further include a third roller 93. The third roller 93 and the first roller 91 may be arranged on the same side of the opening, the third roller 93 may be at least partially located in the opening, and the third roller 93 may be in contact with the display surface of the flexible display panel 2. That is, the supporting plate 31 may be pressed to be in contact with the flexible display panel 2 through the second roller 92; and the positions of both sides of the flexible display panel 2 and the supporting structure 3 may be simultaneously limited by the first roller 91, the second roller 92, and the third roller 93, such that the position limitation of the supporting plate 31 may be realized, and the supporting plate 31 may be prevented from jumping along the third direction Z.

Figure 21:
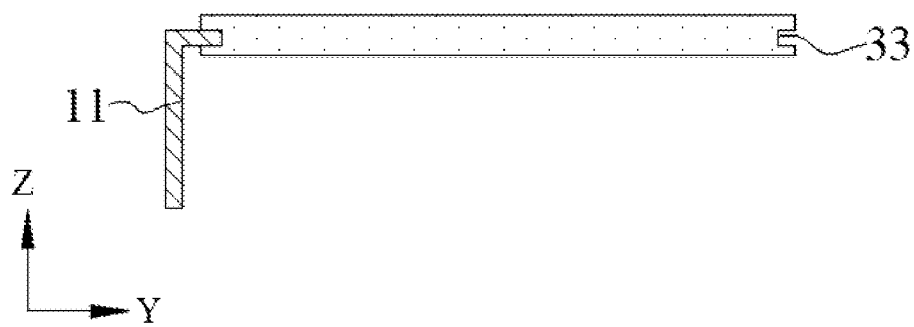
FIG. 21 illustrates a local cross-sectional view along a E-E direction in FIG. 20.

Referring to FIG. 21, FIG. 21 illustrates a local cross-sectional view along a E-E direction in FIG. 20. Furthermore, along the second direction Y, at least one of two opposite sides of the supporting plate 31 may be disposed with a sliding groove 33, the main body structure 1 may be disposed with a limiting part 11 that is matched with the sliding groove 33, and the limiting part 11 may partially extend into the sliding groove 33 to limit the movement path of the supporting plate 31 in the opening. When the supporting structure 3 passes through the opening, the limiting part 11 disposed on the main body structure 1 may extend into the sliding groove 33 disposed on the side of the supporting plate 31, which may further limit the movement path of the supporting plate 31 in the opening and prevent the supporting plate 31 from jumping along the third direction Z.

Figure 22:
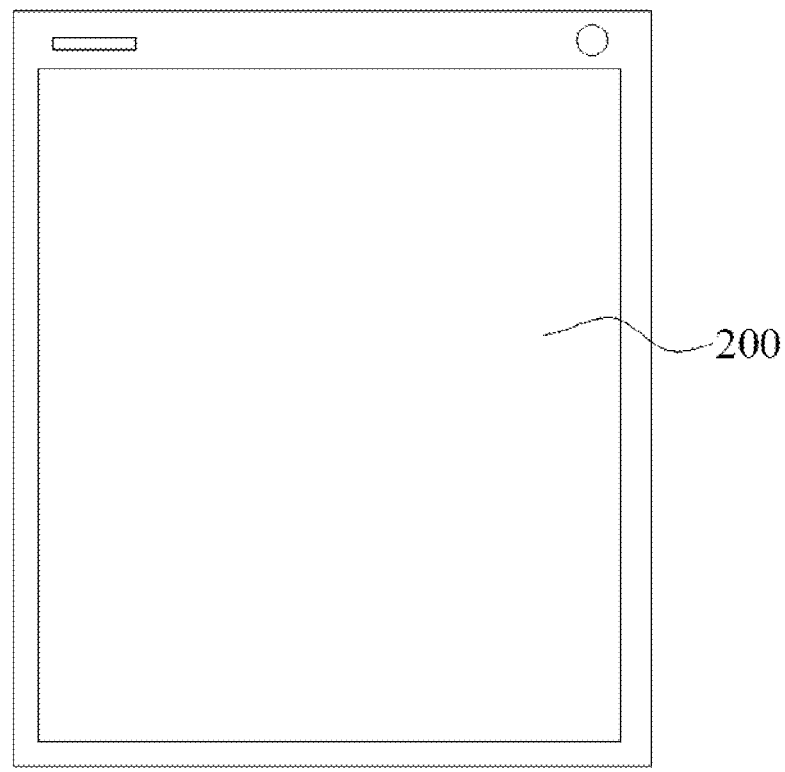
FIG. 22 illustrates a schematic of an electronic device according to various embodiments of the present disclosure.

Referring to FIG. 22, embodiments of the present disclosure also provide an electronic device 200. FIG. 22 illustrates a schematic of an electronic device 200 according to various embodiments of the present disclosure. The electronic device 200 may include a flexible display apparatus 100, which is the flexible display apparatus 100 in the above-mentioned embodiments. Therefore, the electronic device 200 provided by embodiments of the present disclosure has the technical effects of the technical solution of the flexible display apparatus 100 in any one of the above-mentioned embodiments; and the structure and the explanation of terms that are same as or corresponding to the above-mentioned embodiments may not be repeated in detail herein. The electronic device 200 provided in embodiments of the present disclosure may be a mobile phone or any electronic product with display function, including but not limited to the following categories such as televisions, laptops, desktop displays, tablet computers, digital cameras, smart hands rings, smart glasses, car monitors, medical equipment, industrial control equipment, touch interactive terminals, or the like, which may not be limited according to various embodiments of the present disclosure.

The above are merely some embodiments of the present disclosure. Those skilled in the art can clearly understand that, for the convenience and conciseness of description, the working process of the system, module and unit described above may refer to the corresponding process in the above-mentioned method embodiments, which may not be described in detail herein. It should be understood that the scope of protection of the present disclosure may not be limited to those embodiments. Those skilled in the art may easily think of various equivalent modifications or substitutions within the technical scope disclosed in the present disclosure, and these modifications or substitutions should be covered by the protection scope of the present disclosure.

It should also be noted that exemplary embodiments mentioned in the present disclosure describe certain methods or systems based on a series of steps or devices. However, the present disclosure may not be limited to the order of the above-mentioned steps; that is, the steps may be executed in the order mentioned in embodiments or may be different from the order in embodiments, or several steps may be executed at the same time.

What is claimed is:

1. A flexible display apparatus, comprising:
   a main body structure, having a hollow space;
   a flexible display panel;
   a supporting structure; and
   a locking part, wherein:
   both the flexible display panel and the supporting structure are capable of being rolled in the hollow space, the supporting structure includes a plurality of supporting plates, a locking groove is formed between two adjacent supporting plates of the plurality of supporting plates, and at least a first degree of rotation freedom is between the two adjacent supporting plates; and
   the supporting structure has an unfolded state; in the unfolded state, both the supporting structure and the flexible display panel at least partially extend out of the main body structure; and the locking part acts on the supporting structure that extends from the main body structure to limit the first degree of rotation freedom of the plurality of supporting plates, such that the supporting structure flatly supports the flexible display panel.

2. The flexible display apparatus according to claim 1, wherein:
   in the unfolded state, the locking groove is coupled with the locking part correspondingly to flatly support the flexible display panel.

3. The flexible display apparatus according to claim 1, wherein:
   a first groove portion and a second groove portion are respectively formed on opposite edges of the two adjacent supporting plates; and the first groove portion and the second groove portion are matched to form the locking groove.

4. The flexible display apparatus according to claim 1, wherein:
   along a first direction, all locking grooves are arranged along a same straight line passing through center points of all of the plurality of supporting plates.

5. The flexible display apparatus according to claim 1, wherein:
   along a second direction, the locking groove is arranged adjacent to any side of two opposite sides of a supporting plate; and
   along a first direction, two neighboring locking grooves are arranged adjacent to different sides of the supporting plate, wherein the second direction is perpendicular to the first direction.

6. The flexible display apparatus according to claim 1, wherein:
one of the two adjacent supporting plates is disposed with a rotating axle, and another one of the two adjacent supporting plates is disposed with a sleeve; and the two adjacent supporting plates are correspondingly connected by the rotating axle and the sleeve.

7. The flexible display apparatus according to claim 1, wherein:
the locking part includes a protrusion portion freely extending along a direction from a back side of the flexible display panel to a display surface away from the flexible display panel; and the protrusion portion is matched with the locking groove.

8. The flexible display apparatus according to claim 7, wherein:
along an extending direction of the protrusion portion, a cross-sectional area of the protrusion portion is gradually tapered from a connecting end connected to the back side to a free end of the protrusion portion.

9. The flexible display apparatus according to claim 7, wherein:
a cross section of the protrusion portion along the extending direction includes at least one of a triangle, a trapezoid, and a semicircle.

10. The flexible display apparatus according to claim 1, wherein:
an opening area of the locking groove along a third direction gradually decreases from an end adjacent to the flexible display panel to an end away from the flexible display panel.

11. The flexible display apparatus according to claim 10, wherein:
a cross section of the locking groove is an inverted trapezoid along the third direction; and the third direction is perpendicular to a first direction.

12. The flexible display apparatus according to claim 7, wherein:
along a first direction, centers of all protrusion portions are not on a same straight line.

13. The flexible display apparatus according to claim 7, wherein:
a gap filling portion is disposed on at least a partial outer surface of the protrusion portion.

14. The flexible display apparatus according to claim 13, wherein:
the gap filling portion includes at least one of an inflatable gas bag, silica gel, and sponge.

15. The flexible display apparatus according to claim 1, wherein:
one of two opposite sides of the two adjacent supporting plates is a convex arc surface, and another one of the two opposite sides is a concave arc surface; and curvatures of the convex arc surface and the concave arc surface are equal to each other.

16. The flexible display apparatus according to claim 1, wherein:
the locking part and the flexible display panel are detachably connected with each other; and
a plurality of to-be-attracted elements is arranged spaced apart along a first direction on a back side of the flexible display panel; locking parts includes a plurality of magnetic protrusion portions; and the plurality of magnetic protrusion portions is correspondingly attracted to the plurality of to-be-attracted elements.

17. The flexible display apparatus according to claim 7, further including:
a rolling axle assembly including a first rolling axle and a second rolling axle, wherein:
the rolling axle assembly is disposed in the hollow space; and the first rolling axle and the second rolling axle are rotatably connected with the main body structure, respectively; and
in the unfolded state, the supporting structure and the flexible display panel partially extend out of the hollow space; and the locking groove and the locking part which are at least partially extend out of the hollow space are correspondingly coupled with each other.

18. The flexible display apparatus according to claim 17, wherein:
the rolling axle assembly further includes a third rolling axle, wherein:
the locking part further includes a connecting plate; the connecting plate is connected to the third rolling axle; and the protrusion portion is disposed on a side of the connecting plate facing the supporting structure.

19. The flexible display apparatus according to claim 17, wherein:
the second rolling axle is rolled with N rounds of supporting plates; a length $L_k$ of a supporting plate at a k-th round is less than a length $L_{k+1}$ of a supporting plate at a k+1-th round; and a distance between two adjacent locking parts fitted in the supporting plate located at the k-th round is equal to the length $L_k$ of the supporting plate, wherein $0<k\leq N$;
the length $L_k$ of the supporting plate at the k-th round is calculated as follows:

$$L_k = 2*(R + kh - h/2)*\tan\left(\frac{180°}{g}\right)$$

wherein R is a radius of the second rolling axle, h is a thickness of the supporting plate, and g is a number of the supporting plates in one round; and
a length of the supporting plate is 0.01 mm to 3.0 mm.

20. The flexible display apparatus according to claim 17, wherein:
along a third direction, a height difference is between the first rolling axle and the second rolling axle.

21. The flexible display apparatus according to claim 17, wherein:
a radius of the first rolling axle is equal to a radius of the second rolling axle.

22. The flexible display apparatus according to claim 1, further including:
a pulling part, wherein the pulling part includes a housing and a sliding part; the housing has a sliding rail; the sliding part is capable of sliding along the sliding rail; and ends of the supporting structure and the flexible display panel extending out of the main body structure are respectively connected to the sliding part.

23. The flexible display apparatus according to claim 22, further including:
a pulling force sensor, wherein the pulling force sensor is fixed to the housing; and the pulling force sensor is connected to the sliding part through an elastic part to measure a pulling force received by the sliding part.

24. The flexible display apparatus according to claim 22, wherein:

the sliding part includes an accommodating cavity; the accommodating cavity includes an adhesive extending along a sliding direction of the sliding part; and parts of the supporting structure and the flexible display panel extending into the accommodating cavity are respectively adhered to opposite sides of the adhesive.

25. The flexible display apparatus according to claim 24, further including:
 a buffering part, wherein the buffering part is disposed at least on a first surface of the accommodating cavity; and the first surface is a surface opposite to a surface where the adhesive adheres the supporting structure and the flexible display panel in the accommodating cavity.

26. The flexible display apparatus according to claim 1, further including:
 a fitting auxiliary part, wherein the fitting auxiliary part is disposed in the hollow space; and the fitting auxiliary part is at least abutted against a side surface of the supporting structure opposite to the flexible display panel to correspondingly fit the locking part with the locking groove in an abutting position, wherein:
 the main body structure includes an opening for extending out the supporting structure and the flexible display panel, and the fitting auxiliary part is disposed adjacent to the opening; and
 the fitting auxiliary part includes a first roller and a second roller; along a third direction, the first roller and the second roller are respectively disposed on two sides of the opening; the first roller is in contact with a display surface of the flexible display panel; and the second roller is in contact with a side surface of the supporting structure facing away from the flexible display panel.

27. The flexible display apparatus according to claim 26, wherein:
 the fitting auxiliary part further includes a third roller; the third roller and the first roller are disposed on a same side of the opening; the third roller is at least partially in the opening; and the third roller is in contact with the display surface of the flexible display panel.

28. The flexible display apparatus according to claim 26, wherein:
 along a second direction, at least one of two opposite sides of the supporting plate is disposed with a sliding groove; the main body structure is disposed with a limiting part that is matched with the sliding groove; and the limiting part partially extends into the sliding groove to limit a movement path of the supporting plate in the opening.

29. An electronic device, comprising:
 a flexible display apparatus, comprising:
 a main body structure, having a hollow space;
 a flexible display panel;
 a supporting structure; and
 a locking part, wherein:
  both the flexible display panel and the supporting structure are capable of being rolled in the hollow space, the supporting structure includes a plurality of supporting plates, a locking groove is formed between two adjacent supporting plates of the plurality of supporting plates, and at least a first degree of rotation freedom is between the two adjacent supporting plates; and
  the supporting structure has an unfolded state; in the unfolded state, both the supporting structure and the flexible display panel at least partially extend out of the main body structure; and the locking part acts on the supporting structure that extends from the main body structure to limit the first degree of rotation freedom of the plurality of supporting plates, such that the supporting structure flatly supports the flexible display panel.

* * * * *